(12) United States Patent
Sundararajan et al.

(10) Patent No.: US 7,848,979 B2
(45) Date of Patent: Dec. 7, 2010

(54) SYSTEM, METHOD, SOFTWARE ARRANGEMENT AND COMPUTER-ACCESSIBLE MEDIUM FOR INCORPORATING QUALITATIVE AND QUANTITATIVE INFORMATION INTO AN ECONOMIC MODEL

(75) Inventors: Arun Sundararajan, New York, NY (US); Panagiotis G. Ipeirotis, New York, NY (US); Anindya Ghose, New York, NY (US)

(73) Assignee: New York University, New York, NY (US)

( * ) Notice: Subject to any disclaimer, the term of this patent is extended or adjusted under 35 U.S.C. 154(b) by 940 days.

(21) Appl. No.: 11/507,809

(22) Filed: Aug. 21, 2006

(65) Prior Publication Data

US 2008/0046446 A1 Feb. 21, 2008

(51) Int. Cl.
*G06Q 40/00* (2006.01)
(52) U.S. Cl. .................. 705/35; 10/36; 10/37; 10/400; 10/51; 10/41; 703/23; 709/225; 709/205
(58) Field of Classification Search .................. 705/10, 705/35–37, 400, 14, 51; 703/2; 709/225, 709/205
See application file for complete search history.

(56) References Cited

U.S. PATENT DOCUMENTS

| | | | |
|---|---|---|---|
| 6,311,144 B1 * | 10/2001 | Abu El Ata | ..................... 703/2 |
| 7,428,498 B2 * | 9/2008 | Voltmer et al. | ............ 705/14.27 |
| 2002/0138402 A1 | 9/2002 | Zacharia et al. | |
| 2003/0061096 A1 * | 3/2003 | Gallivan et al. | ................ 705/14 |
| 2004/0177002 A1 * | 9/2004 | Abelow | ......................... 705/14 |
| 2005/0071217 A1 * | 3/2005 | Hoogs et al. | .................. 705/10 |
| 2005/0125322 A1 * | 6/2005 | Lacomb et al. | ................ 705/35 |
| 2005/0149383 A1 | 7/2005 | Zacharia et al. | |
| 2006/0009994 A1 | 1/2006 | Hogg et al. | |
| 2006/0253584 A1 * | 11/2006 | Dixon et al. | ................ 709/225 |

OTHER PUBLICATIONS

Dellarocas (Chrysanthos Dellarocas "The Digitization of Word of Mouth: Promise and Challenges of Online Feedback Mechanisms"; Management Science, vol. 49, No. 10; Oct. 2003, pp. 1407-1424).*

(Continued)

*Primary Examiner*—Harish T. Dass
(74) *Attorney, Agent, or Firm*—Dorsey & Whitney LLP

(57) ABSTRACT

A system, method, software arrangement and computer-accessible medium can be provided for incorporating quantitative and qualitative information into an economic model is provided. An exemplary method for analyzing qualitative information associated with a characteristic of at least one entity based on associated quantitative information, includes, obtaining first information which contains at least in part a qualitative information relating to at least one of the at least one entity; determining second information associated with at least one attribute of the characteristic obtained from the first information; obtaining third information which contains at least in part quantitative information associated with at least one of at least one entity; and establishing fourth information as a function of the second information and the third information to determine which of at least one attribute affects the characteristic. For example, an observable economic variable can be characterized using numerical and qualitative information associated with one or more of the entities. The influence of the quantitative and qualitative information on the observable economic variable for a given entity relative to other entities may be determined using statistical regressions.

42 Claims, 10 Drawing Sheets

OTHER PUBLICATIONS

Paul A. Pavlou et al., "Psychological Contract Violation in Online Marketplaces: Antecedents, Consequences, and Moderating Role", Information Systems Research, Dec. 2005, vol. 16 No. 4, pp. 372-399.

Mikhail I. Melnik et al., "Does a Sellers' Ecommerce Reputation Matter" Evidence from Ebay Auctions, The Journal of Industrial Economics, Sep. 2002, vol. L No. 3, pp. 337-349.

Paul A. Pavlou et al., "The Nature and Role of Feedback Text Comments on Online Marketplaces: Implications for Trust Building, Price Premiums, and Seller Differentiation", Aug. 2006, pp. 1-30.

Anindya Ghose et al., "Effect of Electronic Secondary Markets on the Supply Chain", Journal if Management Information Systems, Fall 2005, vol. 22 No. 2, pp. 91-120.

David H. Eaton et al., "Valuing Information: Evidence from Guitar Auctions in eBay", Jan. 16, 2002, pp. 1-27.

Thomas G. Watkins et al., Journal of Applied Economics and Policy, 2005, vol. 24 No. 1, pp. 1-67.

Kirthi Kalyanam et al., "Return on Reputation in Online Auction Markets", Jun. 26, 2001, pp. 1-36.

Anindya Ghose et al., "The Dimensions of Reputation in Electronic Markets", Working Paper CeDER, 2002, pp. 1-33.

Anindya Ghose et al., "Reputation Premiums in Electronic Peer-to-Peer Markets: Analyzing Textual Feedback and Network Structure", SIGCOMM Workshops, 2005, pp. 1-5.

* cited by examiner

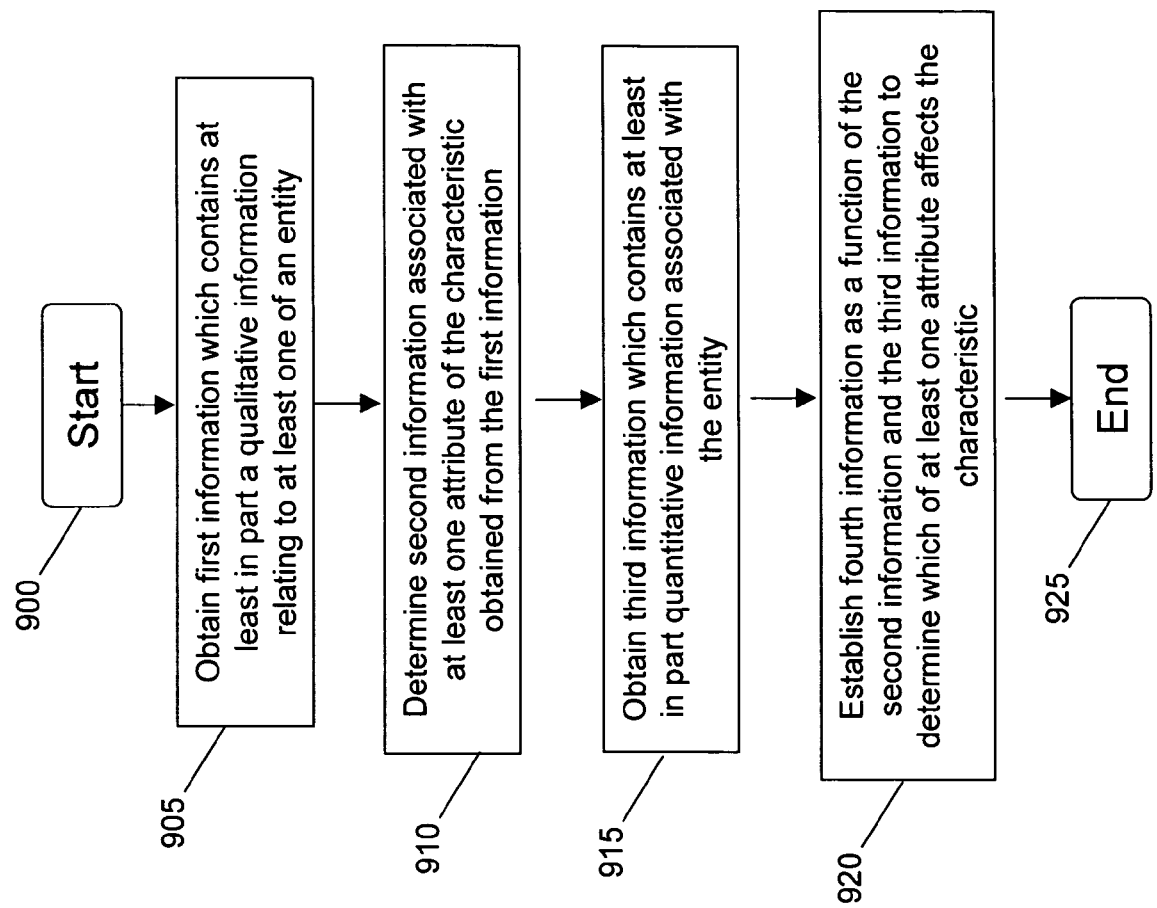

SYSTEM, METHOD, SOFTWARE ARRANGEMENT AND COMPUTER-ACCESSIBLE MEDIUM FOR INCORPORATING QUALITATIVE AND QUANTITATIVE INFORMATION INTO AN ECONOMIC MODEL

FIELD OF THE INVENTION

The present invention relates generally to a system, a method, a software arrangement, and a computer-accessible medium for incorporating qualitative and quantitative information into an economic model. In particular, the exemplary system, method, software arrangement and computer-accessible medium of the present invention can provide a model for incorporating qualitative information into an economic model that can relate to the reputation of sellers in an electronic market to the pricing power of the sellers.

BACKGROUND INFORMATION

The expansion of the Internet has revolutionized the ways in which sales transactions are conducted. Buyers and sellers are no longer tied to traditional retail-based or catalog-based transactions. At any given time, millions of transactions are conducted worldwide via the Internet on multiple web sites. Web sites include those associated with one or more sellers advertising and selling their products for buyers visiting the sites, such as Amazon.com®, Yahoo® Shopping and eBay®, as well as those associated with both sellers offering products and services for sale and buyers looking for products and services on messages posted on the sites, such as Craigslist.com®.

Web sites in which sales transactions are conducted can be referred to as "electronic marketplaces" generally characterized by fast, efficient, and easy shopping experiences for buyers. Such electronic marketplaces have become so prevalent that they have at times replaced traditional forms of shopping for certain products and services. Besides offering the convenience of shopping online at any time of day, electronic marketplaces can also provide buyers with a vast array of services that can enhance the shopping experience, including, for example, instant product reviews, feedback from other buyers, and product recommendations, among others.

When buyers purchase products in an electronic market, they can assess and likely pay not only for the products they wish to purchase, but also for a set of fulfillment characteristics. These fulfillment characteristics include, for example, packaging, timeliness of delivery, the extent to which the product description matches the actual product, and the reliability of settlement.

In traditional retail-based transactions, the buyers have a deterministic way of assessing the quality of such fulfillment characteristics. For example, the buyers can physically visit a traditional retail-based outfit and inspect the product and packaging before shipment and settle the transaction immediately after purchase. In the electronic markets, however, fulfillment characteristics may not be reliably described or verified in advance of a product purchase. Such markets generally rely on reputation systems to ensure their viability and efficiency, and to substitute for the trade processes usually taken for granted in traditional transactions. Such markets also may have user-generated qualitative information, such as product reviews and assessments, regarding the products sold in the marketplace.

Reputation systems in the electronic markets are typically represented by a "reputation profile" that provides the potential buyers with information regarding: (a) the number of transactions a seller has successfully completed; (b) a summary of scores (or ratings) from buyers who have completed transactions with the seller in the past; and (c) a chronological list of textual feedback provided by these buyers.

A casual observation of the electronic markets can suggest that different sellers in these markets derive their reputation from different characteristics. For example, some sellers have a reputation for fast delivery, others have a reputation for having the lowest price among their peers, some are praised for their packaging, while others are appreciated for selling high-quality goods but are criticized for being rather slow with shipping. This information, which can be valuable to buyers who may be heterogeneous in the relative value they place on each of the fulfillment characteristics of a transaction, is often contained in textual feedback that may not be structured, and thus this information may not be readily accessible.

Previous reputation systems have focused mostly on their impact on market outcomes using a single number to characterize a seller, such as the average numerical score attributed to the seller and reported by prior buyers, without any significant investigation on how the valuable information embedded in the textual feedback may actually affect the market outcomes. Such previous systems may have used hedonic regressions of absolute price that generally view reputation as a product characteristic to show that the buyers pay more to the sellers who have better histories.

For example, Kalyanam, K., et al., "Return on reputation in online auction market," Working Paper 02/03-10-WP, Leavy School of Business, Santa Clara University, 2001, presents the effects of online reputation systems on the price of Palm Pilots and PDAs, and Melnik, M. I., et al., "Does a seller's reputation matter? Evidence from eBay auctions," Journal of Industrial Economics, 50(3), pp. 337-350, 2002, describes the effects of online reputation systems on the price of gold coins. Both of these publications describe that positive feedback from online buyers increases prices, while negative feedback decreases prices.

However, not all of the results in systems and publications are consistent. For example, Eaton, D., "Valuing information: evidence from guitar auctions on eBay," Working Paper # 0201, Department of Economics, Murray State University, 2002 describes the results which show that positive feedback from online buyers has no effect on the probability of sale or price of electric guitars and negative feedback reduces the probability of sale only for sellers with more than 20 feedback postings. Ghose, A. et al., "Effect of electronic secondary markets on the supply chain," Journal of Management Information Systems, 22(2), pp. 91-120, 2005, describes the results which show that the online reputation of sellers has no significant or consistent impact on the prices of used books.

The lack of consistency in the results described in these and other prior publications on the effects of reputation systems on the electronic market outcomes may be explained by a more robust measure of the value of reputation (e.g., a price premium, rather than simply absolute price) and a further exploration of the dimensions of reputation that may be found in a specific kind of qualitative information source, i.e., textual feedback. Pavlou, P. et al., "Psychological contract violation in online marketplaces: antecedents, consequences, and moderating role," *Information Systems Research,* 16(4), pp. 272-299, 2005 describes that textual feedback is shown to influence price premiums and affect psychological contract violation in online marketplaces. The role of textual feedback in building buyers' trust on the eBay® online marketplace and how it affects price premiums is further described in Pavlou, P. et al., "The Nature and Role of Feedback Text Comments in Online Marketplaces: Implications for Trust Building and Price Premiums," published at http://www.agsm.ucr.edu/faculty/pages/pavlou.html, 2006.

These publications, however, rely on a manual and expensive content analysis of textual feedback that likely identify only two trust dimensions: i.e., credibility and benevolence. As a result, only a small proportion of text comments are categorized as providing evidence of a seller's outstanding credibility and benevolence. Independent of the differences in their preferences for fulfillment characteristics, the buyers may vary in the way they access and score a transaction. Text-based descriptions of a transaction quality can therefore augment and increase the richness of the information contained in numerical reputation scores. The full extent of the effects of the textual feedback in the outcomes of electronic marketplaces has not yet been determined.

There also exists a wide variety of other qualitative information that, appropriately structured and quantified, can explain other observable economic outcomes. For example, textual information posted by travelers on web-based travel sites can contain information that may explain the prices of hotels at a destination, or the volume of tourist travel to that destination. For example, qualitative feedback from consumers about the quality of products may contain information that explains their demand or total revenue. For example, reviews of restaurants posted by prior diners may contain information that explains the prices charged by these restaurants, or the fraction of tables that are occupied on average. For example, audio recordings of customer service calls may contain information that explain the rate at which customers return products to a merchant, or the rate of repeat purchases from the merchant.

Thus, there remains a need to provide a model, system, method, software arrangement and computer-accessible medium for identifying different dimensions of textual and other feedback in online reputation systems, and characterizing their influence on the pricing power of sellers.

SUMMARY OF THE INVENTION

In view of the foregoing, exemplary embodiments of the present invention generally provides a system, a method, a software arrangement, and a computer-accessible medium for incorporating qualitative and quantitative information into an economic model. For example, the economic model analyzes and values the quantitative and qualitative information based on some observable economic variable. For example, an exemplary economic model, system, method, software arrangement and computer-accessible medium may be constructed for analyzing the influence of quantitative and qualitative information of product reviews posted in the electronic marketplace on observable revenues per product, and another model may be constructed for analyzing the influence of quantitative and qualitative information regarding the online reputation of merchants in the electronic marketplace on observable price premiums commanded by the merchants, among others.

The exemplary description that follows describes an example in which the influence of quantitative and qualitative information regarding the online reputation of merchants or sellers are analyzed in an electronic marketplace on observable price premiums commanded by the sellers. The exemplary economic model, system, method, software arrangement and computer-accessible medium measures the extent to which numerical and textual feedback posted by buyers affect outcomes in an electronic market, for example, the extent to which the buyers' feedback affect the pricing power of sellers.

In another exemplary embodiment of the present invention, the model, system, method, software arrangement and computer-accessible medium can obtain and/or provide information mined from the textual feedback of the seller. The textual feedback can be mined to identify the unique dimensions associated with the seller's recorded reputation, such as delivery and packaging, and then locate the text modifiers associated with each dimension. In accordance with an exemplary embodiment of the present invention, the text modifiers can generally be words that relate, qualify, specify or distinguish a particular dimension, such as adjectives, adverbs, or a combination of those.

In another exemplary embodiment, the econometric model is augmented to include information mined from the textual feedback of the seller. The textual feedback is mined to identify the unique dimensions associated with a seller's recorded reputation, such as delivery and packaging, and then to locate the text modifiers associated with each dimension. In accordance with the present invention, the text modifiers are generally words that relate, qualify, specify or distinguish a given dimension, such as adjectives, adverbs, or a combination of those.

The unstructured textual feedback can be converted into a vector of dimension-modifier pairs, such as, for example, "fast delivery," and "great packaging," thereby yielding an extensive data set that describes, for each transaction, the prices and characteristics of successful sellers, as well as those of their competitors. A scoring function can be calibrated to assign dimension-specific pricing premium scores to each of the modifiers encountered.

These and other exemplary embodiments of the present invention can provide variables that form inputs into statistical and econometric methods and procedures for making inferences about how the qualitative information affects and outcomes associated with the sellers. For example, Ordinary Least Squares ("OLS") regressions of pricing premiums on reputations with fixed effects that can control for an unobserved heterogeneity across the sellers and the products, as well as regressions that can control for an unobserved heterogeneity across products, sellers, and competitors. The regressions can isolate the extent to which the information contained in the numerical and textual feedback of a seller's contributes toward its pricing power, and, e.g., provide a ranking of the value of each dimension-modifier pair based on its impact on pricing power.

According to these and other embodiments of the present invention, the exemplary system, method, software arrangement and computer-accessible medium can be provided for incorporating the qualitative and quantitative information into an economic model. For example, such embodiments can use a computing device that may be coupled to a display and a printer. The computing device can include modules for carrying out different aspects of the exemplary embodiments of the present invention as summarized above and described in more detail herein below. The modules may be in hardware or software or combinations of hardware and software. In one exemplary embodiment of the present invention, the computing device can include a microprocessor and a memory device coupled to the microprocessor, and the modules include software programs stored as program instructions in a computer readable medium associated with the memory device.

Further, econometric and text mining techniques according to an exemplary embodiment of the present invention can provide detailed analysis of the information captured by exemplary reputation systems, and presents further evidence of the importance of their effective and judicious design. In particular, the exemplary model, method, software arrangement and computer-accessible medium can be provided to establish the value of the information contained in the textual feedback of online reputation systems and the importance of including this information in evaluating how the seller's reputation may affect the outcomes in an electronic market.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIG. 9A is a flow chart of one exemplary embodiment of the method according to the present invention for analyzing qualitative information associated with a characteristic of at least one entity based on associated quantitative information.

Figure 1:
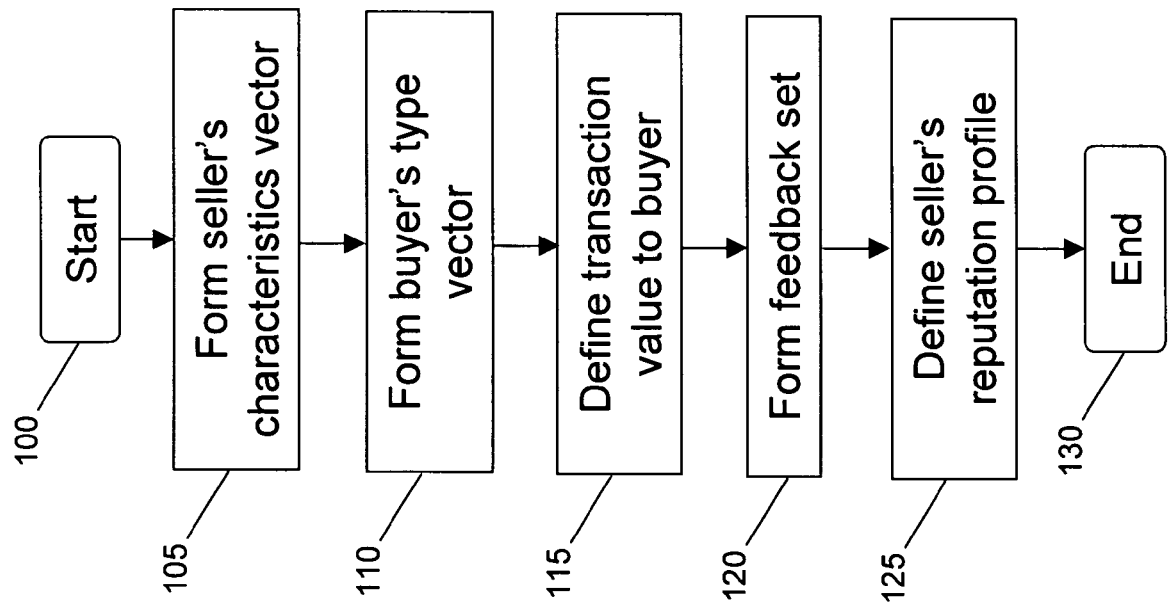
FIG. 1 is a flow chart identifying exemplary procedure for defining an online reputation of a seller according to an exemplary embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EMBODIMENTS OF THE INVENTION

Generally, in accordance with exemplary embodiments of the present invention, a system, method, software arrangement and computer-accessible medium can be provided for incorporating qualitative and quantitative information into an economic model. The economic model may analyze and valuate the quantitative and qualitative information based on a certain observable economic variable. For example, an economic model may be provided for analyzing the influence of quantitative and qualitative information of product reviews posted in an electronic marketplace on observable revenues per product. Another exemplary model may be provided for analyzing the influence of quantitative and qualitative information regarding the online reputation of merchants in an electronic marketplace on observable price premiums commanded by the merchants, among others. Another exemplary embodiment of a model according to the present invention may be provided for analyzing the influence of textual information posted by users (e.g., travelers on web-based travel sites) on the prices of hotels at a destination, and/or the volume of tourist travel to that destination. Another exemplary embodiment of the model may be provided for analyzing the influence of reviews of restaurants posted by certain users (e.g., prior diners) on the prices charged by these restaurants, or the fraction of tables that are occupied on average. Another exemplary embodiment of the model may be provided for analyzing the influence of audio recordings of customer service calls on the rate at which customers return products to a merchant, and/or the rate of repeat purchases from the merchant.

The exemplary description provided below mainly concerns the latter example, e.g., analyzing the influence of quantitative and qualitative information regarding the online reputation of merchants or sellers in an electronic marketplace on observable price premiums commanded by the sellers. The exemplary economic model according to one exemplary embodiment of the present invention measures the extent to which numerical and textual feedback posted by buyers affect outcomes in an electronic market, for example, the extent to which the buyers' feedback affect the pricing power of sellers.

As stated herein, an electronic market may be any marketplace in which transactions are conducted by electronic means, such as via a web site, and in which multiple competing sellers offer a single product for purchase by multiple buyers. In addition to the product, the electronic marketplace also includes a reputation system to characterize sellers in the market by a numerical and textual feedback posted by a subset or all of the buyers of the product.

Online Reputation of Sellers

A flow chart providing exemplary procedures for defining the online reputation of a seller according to one exemplary embodiment of the present invention is shown in FIG. 1. For example, an electronic marketplace can be modeled with m competing sellers offering a single product for purchase by M buyers. The buyers can have n different fulfillment characteristics for each transaction, including, but not limited to, speed of delivery, quality of packaging, and post-sale customer support, among others.

As shown in step 105, e.g., each one of the m competing sellers can be indexed by a characteristics vector $X=(X_1,$ $X_2, \ldots X_n$), where $X_i$ represents the seller's ability to provide the $i^{th}$ dimension of fulfillment. Without deviating from the principles and embodiments of the present invention, the products sold by each one of the m competing sellers can be presumed to be of identical or substantially similar quality.

The M buyers in the marketplace may differ in the extent to which they place importance on each of the fulfillment characteristics provided by the m competing sellers. As such, in step 110, each buyer can be indexed by a type vector $w=(w_1, w_2, \ldots, w_n)$, where a higher value of $w_i$ can indicate that the buyer places a relatively higher value on the $i^{th}$ fulfillment characteristic. Each buyer's type vector may be drawn from a common distribution with a distribution function F(w).

When a buyer purchases a product from a seller, there may be a realized value of fulfillment $z=(z_1, z_2, \ldots, z_n) \in Z$. For example, the quality of fulfillment provided by the seller on that specific transaction. If the price charged by the seller for the product is p, the value that the buyer can obtain from the transaction can then be characterized in step 115 as:

$$u(w,z)-p \quad (1)$$

where u(w,z) can increase in each component of its arguments. For example, u(w,z) may be a weighted average of the realized fulfillment values.

After each transaction, e.g., the buyer can provide a feedback set which may contain an identification ("ID") for the seller ("the seller's ID"), an ID for the buyer ("the buyer's ID") and information about the fulfillment on that transaction. At step 120, a feedback set of the form $t(k)=\{s(k),b),\Phi(k)\}$ can be associated with each transaction k, where the value of s(k) can correspond to the seller's ID, the value of b(k) can correspond to the buyer's ID, and $\Phi(k)$ may contain information about the quality of fulfillment.

In certain exemplary reputation systems, $\Phi(k)$ can contain a numerical score rating the overall quality of the transaction, along with unstructured text describing some of the dimensions of the transaction. In the exemplary embodiments of the present invention, $\Phi(k)$ can be modeled as a vector containing an average numerical score $\Phi(k,0)$, and a score $\Phi(i,k)$ corresponding to each fulfillment characteristic i in transaction k.

Prior to the transaction, a buyer may observe the most of or entire feedback set $\{t(k)\}$ for the electronic market. For any seller j, the buyer can thus identify the seller's feedback profile at step 125 as:

$$T(j)=\{t(k):s(k)=j\} \quad (2)$$

The set of all feedback profiles for all of the m competing sellers in the electronic market can be denoted as T. For example, the buyers can map each feedback profile T(j) to an expected fulfillment characteristics vector using a common mapping $\Gamma: T \to Z$. A seller i is then said to have a better reputation than seller j if:

$$E[u(w,\Pi(T(i)))] \geq E[u(w,\Gamma(T(j)))], \quad (3)$$

where the expected values are taken over the buyer's type vector w according to the distribution of buyer types F(w).

Seller i may thus have a better reputation than seller j for a variety of reasons, such as, for example: (1) seller i has a better average numerical reputation score than seller j; (2) the scores assigned to seller i on any one of the fulfillment characteristics are higher than those assigned to seller j; (3) the scores assigned to seller i on the set of fulfillment characteristics that most buyers care about are higher than those assigned to seller j; and/or (4) T(i) is a larger set than T(j), and the estimate of average reputation generated by the mapping $\Gamma$ reflects risk aversion among potential buyers.

Figure 2:
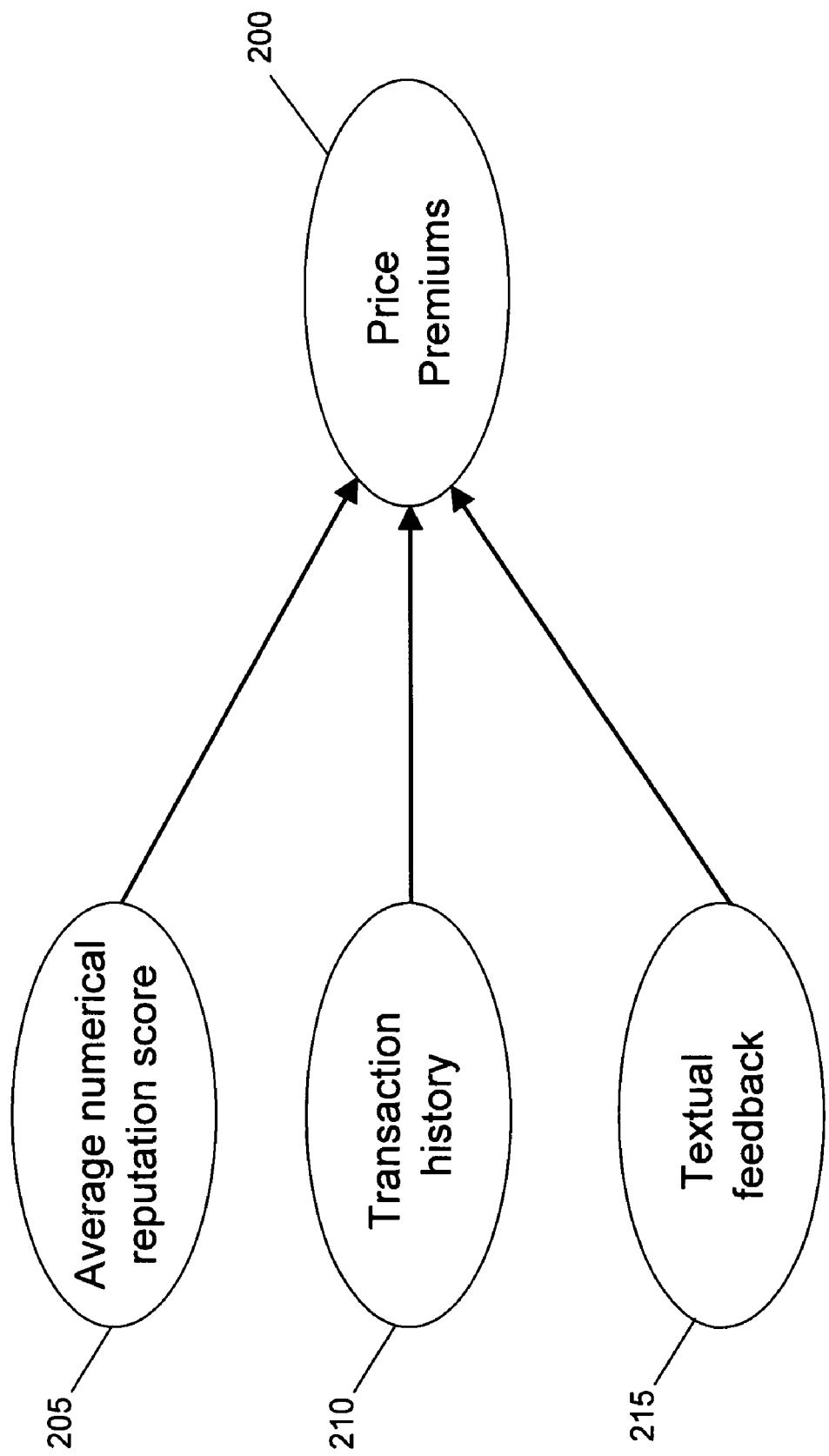
FIG. 2 is a schematic diagram providing factors that may influence price premiums of the seller in an electronic market exemplary.

Accordingly, FIG. 2 shows a schematic diagram of a procedure according to one exemplary embodiment of the present invention for identifying factors that may influence the price premiums of a seller in an electronic market. Since buyers can choose sellers based on a comparison of their expected utility to the price charged by a seller, it may be beneficial and possible for the seller with a better reputation to charge a higher price for the same product and still successfully make a sale. Thus, with the use of a better reputation described above, exemplary reputation systems may affect the outcomes, e.g., price premiums 200, in an electronic market in the following exemplary ways: (a) sellers with a higher numerical reputation score (205) may have higher price premiums associated with their successful transactions; (b) sellers with a higher number of prior transactions (210) may have higher price premiums associated with their successful transactions; and/or (c) sellers with a higher frequency of positive words associated with fulfillment characteristics (215) may have higher price premiums associated with their successful transactions.

Mining Online Data Set to Collect Online Reputation of Sellers

To validate the factors affecting pricing premiums shown in the exemplary diagram of FIG. 2 and to identify other factors, a market-level data set can be compiled on a cross-section of software resellers, and thus several different categories can be encompassed from publicly available information regarding used software product listings at, e.g., Amazon.com®. The data can be collected using automated Java™ scripts which may access XML pages downloaded from, e.g., the Amazon.com® web site.

As described herein, the data set may be collected over a particular period of time (e.g., 180 days between October 2004 and March 2005) for a particular (280) of individual software titles, with an equal or similar number of products from each of certain major software categories, e.g.: (a) Business/Productivity software; (b) Graphics software; (c) Development software; (d) Security/Utilities software; and (e) Operating Systems software.

Figure 3:
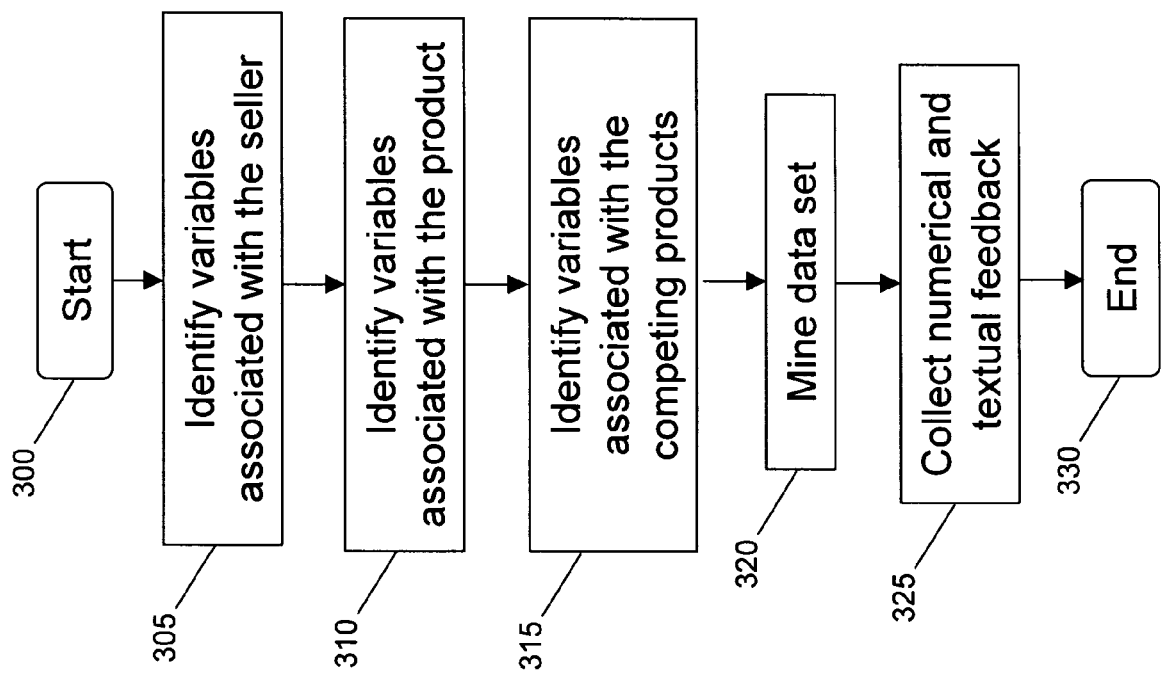
FIG. 3 is a flow chart identifying exemplary procedures for collecting data for testing a model of the present invention according to an exemplary embodiment of the present invention.

Exemplary steps for number collecting the data set that can be used for testing the model according to an exemplary embodiment of method of the present invention is described with reference to the flow diagram FIG. 3. In steps 305 and 310, the variables associated with the seller and the product can be identified. These variables can include: (a) the price at which the product was sold; (b) the seller's ID; (c) the seller's reputation at the time of the transaction, as discussed in more detail herein below; (d) the seller's reported condition of the product; and (e) the duration for which the product was listed before it was sold.

The product condition can be self-reported by the seller, and may be, e.g., "New," "Like New," "Very Good," "Good," or "Acceptable." The set of m sellers in the electronic marketplace of used software titles at the Amazon.com® web site can include individual sellers and professional merchants which can use the retail platform at the Amazon.com® web site commercially.

In step 315, variables associated with the competing identical products available at the time the product is sold can be identified. For each of these competing products, the variables may include: (a) its listed price; (b) the seller's ID; and/or (c) the seller's reputation at the time of the transaction. An example of a set of listings is shown in FIG. 3B.

As an example, the data set can be compiled by mining the XML feed from the Amazon.com® web site every so often (e.g., every eight hours) in step 320. This can be done since the Amazon.com® web site associates a unique transaction ID with each product listing. This transaction ID can be used to distinguish multiple or successive listings of identical products sold by the same seller. When a transaction ID associated with a particular listing is removed from a given XML feed, it can be interpreted to mean that the listed product has been successfully sold in the previous exemplary time period.

In this manner, a unique transaction ID can be associated with each new listing, thereby it is possible to determine when the transactions have occurred even if the seller immediately lists another identical product for sale—while this listing would have the same seller and product, it would have a new transaction ID. Overall, the data set compiled to test the model described herein contains 9484 unique transactions.

Given that the compiled data set has information on most or all transaction and seller IDs during the course of a product's listing life-cycle (e.g., from the time the product was first listed for sale until the time the product was sold) the details of the competitors for any given seller can be inferred from the compiled data set. Mining the data set can therefore yield a compilation of competitors' prices, competitors' ratings over different time periods, competitors' product condition, and the resultant price premium at which each transaction has been made.

In step 325, the reputation history of each seller who has been listed a product during the particular time period (e.g., the 180 day window) may be collected. Each of these sellers can have a feedback profile, which, as described above with reference to FIG. 1, may contain the numerical and textual feedback provided by the buyers. The numerical ratings can be provided, e.g., on a scale of one to five stars, and can be averaged to provide an overall score for each seller. Similar averages may also be reported on the XML feeds over the last 30, 90, and 365 days for each of three categories, e.g., (a) positive; (b) neutral; and/or (c) negative. Exemplary positive, neutral, and negative comments are shown in FIG. 3C.

The numerical and textual feedback associated with a seller can be collected over the entire lifetime of the seller, rather than simply over a particular period. Thus, each seller's feedback profile can be reconstructed at the time each recorded transaction takes place.

The compiled data set can contain, e.g., 1078 sellers, with an average level of experience of, e.g., 4,932 postings. Of the 1078 exemplary sellers in the data set, 122 of them successfully completed transactions during the exemplary 180-day period, while the remaining sellers acted only as participants in the market, without actually selling a product.

The exemplary electronic market of software titles at the Amazon.com® web site can provide a preferable environment to test the exemplary model, method, system, and computer-accessible medium according to the exemplary embodiment of the present invention for a number of reasons. For any given product in the compiled data set, the quality can exhibit a high degree of homogeneity. Indeed, e.g., in the compiled data set, from a maximum exemplary possible 107,922 observations, the number of observations where a product was listed as "New" was 99,518, which is approximately 92%.

As a result, the price variation observed in the secondary markets can be attributed primarily to variation in the seller's performance on the fulfillment characteristics that buyers' value, and the expected quality that the buyers can infer about the seller's potential performance based on the information contained in their feedback profile. Therefore, the failure of the seller to deliver a product, provide unacceptable service, or any failure in fulfillment issues would likely be important to the buyer.

Exemplary Model Which can Exclude Qualitative Information

An exemplary econometric model, method, system, and computer-accessible medium according to the exemplary embodiment that can use the numerical feedback mined from, e.g., the Amazon.com® web site was developed to identify the factors affecting the price premiums collected by the sellers at each transaction. For each transaction, the dependent variable can therefore be a variable corresponding to the price premium.

There are certain possible variants of this dependent variable, e.g., (a) RegPricePremium, which is the difference between the price at which the transaction occurred and the price of each competing seller at that point, leading to N observations per transaction where N is the total number of competing sellers; and (b) AvgPricePremium, which is the difference between the price at which the transaction occurred, and the average prices of the competing sellers, leading to one observation for every transaction.

Figure 4:
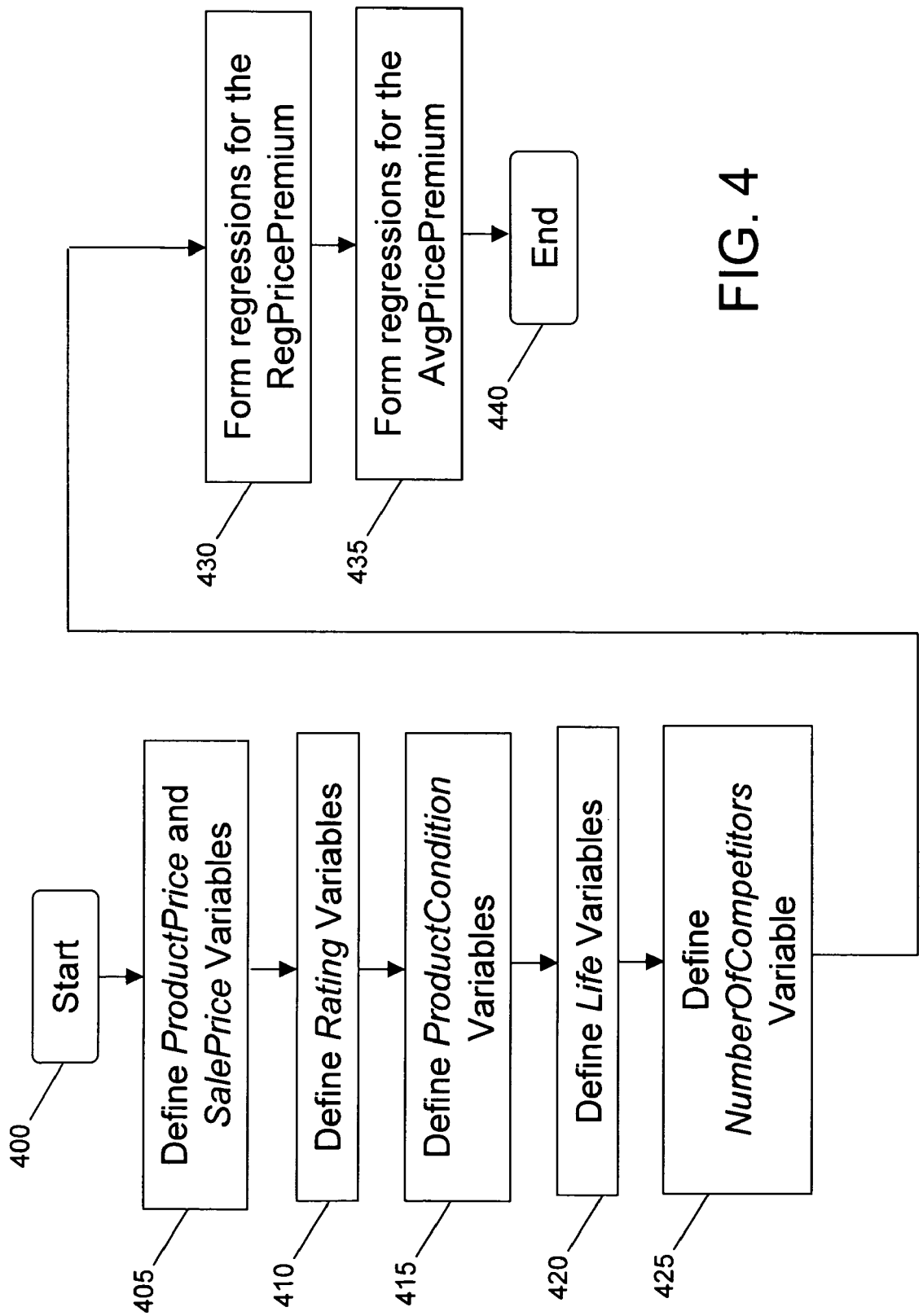
FIG. 4 is a flow chart identifying exemplary procedures for performing an econometric analysis of a data set based on a numerical feedback associated with sellers in an electronic market according to an exemplary embodiment of the present invention.

FIG. 4 shows a flow chart identifying exemplary steps for performing the econometric analysis based on the numerical feedback associated with the sellers according to a certain exemplary embodiment of the present invention. For example, the variables used in the exemplary model can be defined in steps 405-425, and, may include:

(a) ProductPrice, provided in step 405 as, e.g., the price at which the product is listed on the electronic marketplace;

(b) SalePrice, provided in step 405 as, e.g., the price at which the product was sold on the electronic marketplace;

(c) Rating, provided in step 410 as, e.g., the average value of the seller's (SellerRating) and the competitors' (CompetitorsRating) numerical scores over their entire transaction history. Also defined is the variable DiffRating that corresponds to the difference between the average numerical reputation score of each seller and the average of the reputation scores of all the competitors, that is, DiffRating=SellerRating−CompetitorsRating;

(d) ProductCondition, provided in step 415 as, e.g., the average condition of the product as reported by the seller (SellerCondition) and the competitors (Competitor Condition). Also defined is the variable DiffCondition that corresponds to the difference between the product condition reported by the seller and that reported by all the other competitors, that is, DiffCondition=SellerCondition−CompetitorsCondition;

(e) Life, provided in step 420 as, e.g., the total number of seller (SellerLife) and competitor transactions (CompetitorsLife), which measure their level of experience in transacting on the electronic marketplace. Also defined is the variable DiffLife that corresponds to the difference between the number of lifetime transactions completed by the seller and the number of lifetime transactions completed by the competitors, that is, DiffLife=SellerLife−CompetitorsLife; and (f) NumberOfCompetitors, provided in step 425 as, e.g., the number of unique sellers for any given product.

Exemplary descriptive statistics for the defined variables based on data about transactions between October 2004 and March 2005 are shown below in Table 1 herein:

TABLE 1

Summary statistics of numeric variables

| Variable | Observations | Min | Max | Mean | Standard Deviation |
|---|---|---|---|---|---|
| AvgPricePremium | 9484 | 0.006 | 648.12 | 10.57 | 80.55 |
| RegPricePremium | 107922 | 0.0099 | 1016.34 | 8.87 | 104.27 |
| ProductPrice | 107922 | 17.99 | 1699.99 | 191.85 | 238.460 |
| SalePrice | 107922 | 0.99 | 2200 | 203.32 | 241.67 |
| SellerRating | 107922 | 1 | 5 | 4.43 | 0.35 |
| SellerLife | 107922 | 1 | 277309 | 5040.68 | 34183.64 |
| SellerCondition | 107922 | 1 | 5 | 4.89 | 0.40 |
| CompetitorPrice | 107922 | 1.25 | 1909.5 | 194.44 | 222.32 |
| CompetitorRating | 107922 | 1 | 5 | 4.45 | 0.16 |
| CompetitorLife | 107922 | 1 | 275900 | 22323.6 | 23242.2 |
| CompetitorCondition | 107922 | 2 | 5 | 4.88 | 0.135 |
| NumberOfCompetitors | 107922 | 1 | 34 | 14.37 | 6.56 |

Accordingly, in steps 430-435, OLS regressions with fixed effects controlling for unobserved heterogeneity across sellers and products, and the regressions with fixed effects on products, sellers, and competitors, can be set up with the following exemplary equations:

$$\ln(\text{RegPricePremium}) = \alpha + \beta_1 \ln(\text{ProductPrice}) + \beta_2(\text{DiffRating}) + \beta_3 \ln(\text{DiffLife}) + \beta_4(\text{DiffCondition}) + \beta_5 \ln(\text{NumberOfCompetitors}) \quad (4)$$

$$\ln(\text{AvgPricePremium}) = \alpha + \beta_1 \ln(\text{ProductPrice}) + \beta_2(\text{DiffRating}) + \beta_3 \ln(\text{DiffLife}) + \beta_4(\text{DiffCondition}) + \beta_5 \ln(\text{NumberOfCompetitors}) \quad (5)$$

Performing exemplary equations (4) and (5) provided above on the collected data set can yield qualitatively similar exemplary results, shown in Tables 2 and 3 below, respectively.

TABLE 2

Effects of average reputation and level of experience on pricing power with Regular Price Premium as the dependent variable

| Variable | Estimates (Seller and product level fixed effects) | Estimates (Product, seller, and competitor fixed effects) |
|---|---|---|
| Constant | 1.66 (1.24) | 8.01 (0.44) |
| ln(ProductPrice) | −0.15 (0.19) | 0.41 (0.085) |
| DiffRating | −0.14 (0.007) | 0.187 (0.012) |
| ln(DiffLife) | 0.011 (0.0005) | 0.051 (0.003) |
| DiffCondition | 0.27 (0.01) | 0.017 (0.007) |
| ln(NumberOfCompetitors) | −2.02 (0.01) | −1.42 (0.026) |
| $R^2$(%) | 49.35 | 13.89 |

TABLE 3

Effects of average reputation and level of experience on pricing power with Average Price Premium as the dependent variable

| Variable | Estimates (Seller and product level fixed effects) |
|---|---|
| Constant | −1.27 (2.04) |
| ln(ProductPrice) | 0.75 (0.39) |
| DiffRating | −0.37 (0.06) |
| ln(DiffLife) | 0.048 (0.008) |
| DiffCondition | 0.11 (0.06) |
| ln(NumberOfCompetitors) | 0.43 (0.03) |
| $R^2$(%) | 13.2 |

In both cases, these exemplary results strongly support the hypothesis that both average seller reputation (represented by the Rating variables) may and the seller's level of experience (represented by the Life variables) may have a positive and significant effect on pricing premiums. For example, the average price premium can change much more frequently with changes in average reputation and experience than the price premium relative to one's nearest competitor. The coefficient of ln(ProductPrice) can be less than 1 in each case, indicating that while the magnitude of the price premium increases with product price, it decreases in percentage terms. This is consistent with the exemplary model described herein that treats the seller's reputation as measuring characteristics that have to do with fulfillment rather than the product itself. For example, the premium does not increase, but is proportionate to the increase in sale price.

The negative sign on the coefficient of the DiffRating variable is, however, somewhat surprising. The sign is expected to be positive as is the case when an unobserved heterogeneity across competitors can be controlled as well with price premiums. A further exemplary analysis of the collected data can reveal the intuition. For example, the negative sign in this exemplary data results from an exceedingly high number of observations (over two-thirds) in the collected data set, where the DiffRating variable is negative in magnitude. This is due to the presence of a number of very powerful sellers in the collected set who have been able to generate an excellent numeric reputation. Thus, in certain instances, those sellers would likely have a higher numeric rating (e.g., close to a perfect 5.0) than most of the other sellers. As a consequence, when this variable decreases, the price premium that a seller can command an increase.

Furthermore, these exemplary results can also indicate that despite having significant lower numeric ratings than their competitors, many sellers are able to charge a positive price premium during a transaction. This can be explained since there may be certain important reputation information embedded in the qualitative textual feedback that the buyers have provided about the sellers. In addition, future buyers may also evaluate prospective sellers based on this qualitative feedback. However, in order to assess the extent to which such qualitative information affects the economic variable in question—e.g., a seller's price premium—an exemplary embodiment of a system, method, software arrangement, and a computer-accessible medium for structuring this qualitative information and transforming it into a form can be provided that is amenable to a meaningful quantitative analysis.

Exemplary Model Which can Include Qualitative Information

An exemplary embodiment of the model, method, system and computer-accessible medium according to the present invention can be provided for structuring the textual feedback of the sellers and competitors, and for discovering the dimensions of reputation, e.g., "packaging," in the textual feedback. One of the goals of the exemplary model, system, and computer-accessible medium is to determine the dimensions that can contribute to the reputation of each seller, identify the weight of that contribution, and quantitatively value the textual feedback provided by buyers on each dimension, e.g., that "cool packaging" is more positive than "good packaging."

For example, each seller can be characterized by a vector of characteristics $X=(X_1, X_2, \ldots, X_n)$, representing the seller's ability on each of n fulfillment characteristics. The exemplary model, method, system and computer-accessible medium described herein can be based on the idea that each of these n characteristics or dimensions can be expressed by a noun or a verb phrase chosen from the set of all textual feedback, and that the seller may be evaluated on these n dimensions. For example, dimension 1 may be "shipping," dimension 2 may be "packaging," etc.

When posting a textual feedback, the buyers generally do not assign explicit numeric scores to each (or to any) dimension. Rather, the buyers can use dimension modifiers, which can generally be words that relate, qualify, specify or distinguish a given dimension, such as adjectives, adverbs, or a combination of those, to evaluate the sellers along each of these dimensions. When the set of all dimensions are identified, each posting in the textual feedback present in the collected data set may be parsed to associate a modifier with each dimension. The textual feedback can then be represented as a n-dimensional vector of modifiers.

To illustrate this exemplary procedure using an example, suppose dimension 1 is "delivery," dimension 2 is "packaging," and dimension 3 is "service." A feedback set $\Phi_1$ which contains the posting "I was impressed by the speedy delivery! Great service!" can then be encoded as:

$\Phi_1$=[speedy, NULL, great]

while a feedback set which contains the posting "The item arrived in awful packaging, and the delivery was slow" may be encoded as:

$\Phi_1$=[slow, awful, NULL]

Further, the set of modifiers can be $M=\{NULL, \mu_1, \ldots, \mu_m\}$ and the seller i whose level of experience is $|S_i|=p$ can be considered. $\mu^i_{jk} \in M$ can denote the modifier that appears in the j-th posting, and may be used to access the fulfillment quality of the k-th dimension. The information extracted from the textual feedback for the seller i can then be structured as an n×p matrix M(i) whose rows may be the p encoded vectors of modifiers associated with the seller.

Accordingly, as shown in a flow diagram of the method according to another exemplary embodiment of the present invention in FIG. 5, the method for identifying dimension-modifier pairs in the textual feedback associated with a seller in an electronic market may be as follows. In step 505, the textual feedback postings associated with the seller may be retrieved from the collected data set. Further, in step 510, the feedback postings may be parsed to identify the dimensions across which a buyer evaluates the seller. For this task, a part-of-speech ("POS") tagger, known to those of ordinary skill in the art and which parses each posting and identifies the part-of-speech for each word can be used. The parts-of-speech generally are the verbs, nouns, pronouns, adjectives, adverbs, prepositions, conjunctions, and interjections. The nouns, noun phrases, verbs, and verbal phrases may be kept as dimensions of the seller in step 515.

In steps 520 and 525, the adjectives and adjectival phrases that modify the nouns and noun phrases (520) and the adverbs and adverbial phrases that modify the verbs and verbal phrases (525) can be tagged as modifiers. The modifiers can be associated with their corresponding dimensions with the use of a syntactic parser, which as generally referred herein, analyzes the linguistic structure of each sentence and identifies the relations between the words. An example of a syntactic parser that may be used for this purpose can be, e.g., the "Collins HeadFinder" parser distributed with the JavaNLP package from the Natural Language Processing Group at Stanford University.

For example, the dimension-modifier pairs that appear in feedback profiles of less than 50 (out of the 1078 sellers in the collected data set) may be eliminated from consideration in step 530 since statistically meaningful results for such sparse dimensions are usually not extracted. In step 535, the dimension-modifier pairs to be used in regressions for the price premium variables, i.e., RegPricePremium and AvgPricePremium, can be identified.

Figure 5:
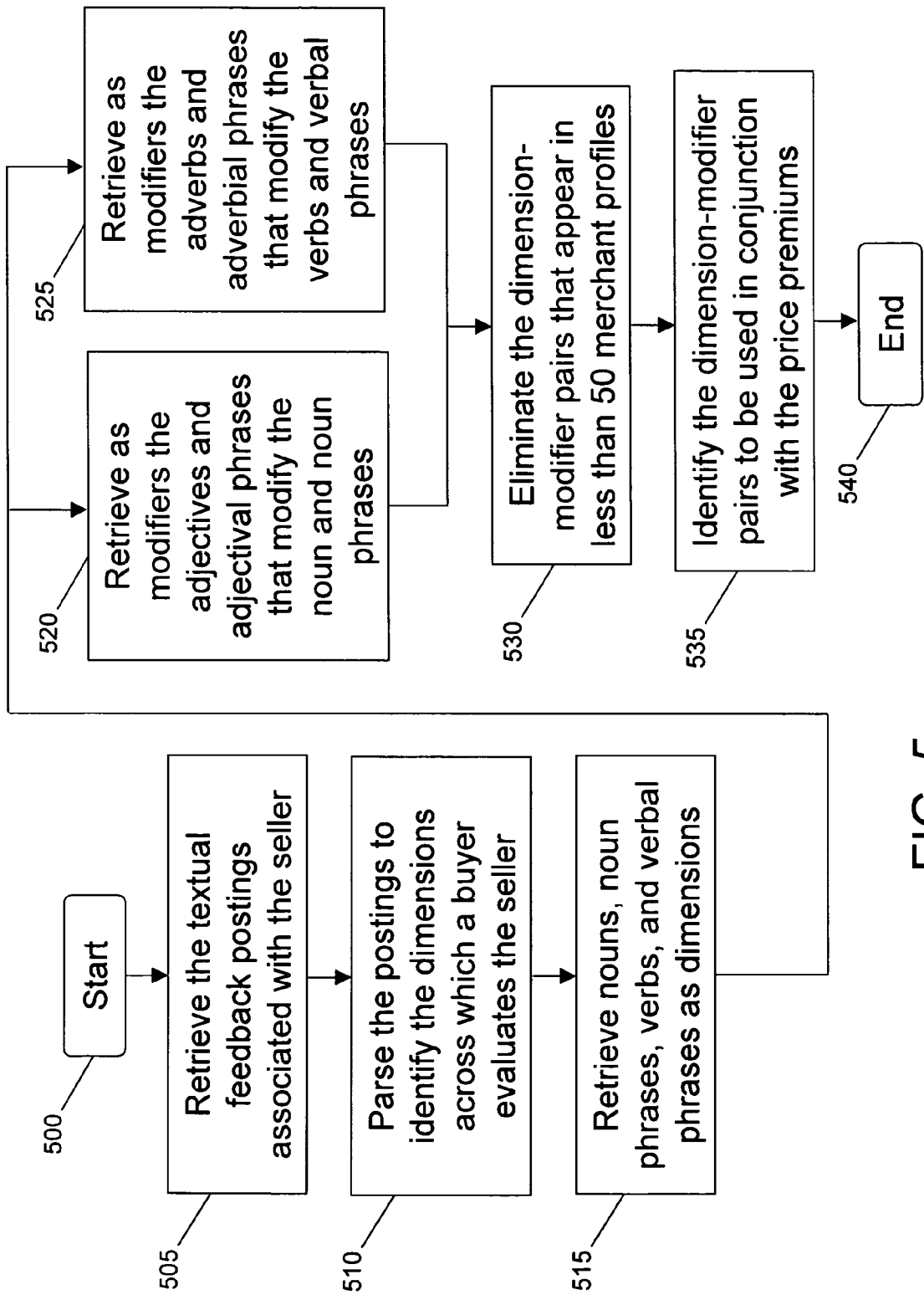
FIG. 5 is a flow chart of exemplary procedures for identifying dimension-modifier pairs in a textual feedback associated with the sellers in the electronic market according to an exemplary embodiment of the present invention.

The exemplary steps shown in the exemplary flow diagram of FIG. 5 were implemented on the textual feedback of each one of the sellers in the collected data set. The set of all textual feedback may thus be transformed into the set T which can contain the feedback sets t(k) (as provided in Equation (2) above). Each set t(k) can contain the seller's ID s(k), the buyer's ID b(k), the encoded vector of modifiers [$\Phi(k,1)$, $\Phi(k,2), \ldots, \Phi(k,n)$] along each of the n dimensions, and the numerical score $\Phi(k,0)$ associated with that posting. This can yield, e.g., 151 unique dimensions and a total of 142 modifiers with the collected data set. The dimensions of reputation are the nouns and verbs that have been "modified" by adjectives and adverbs. A subset of the exemplary summary statistics for the most frequent dimension-modifier pairs are shown in Tables 4-8.

TABLE 4

Exemplary summary statistics of dimension-modifier pairs

| Dimension-Modifier Pair | Observations | Mean | Standard Deviation | Min | Max |
|---|---|---|---|---|---|
| never sent | 107922 | 0.0000658 | 0.0022875 | −0.0526316 | 0.0526316 |
| very recommended | 107922 | −0.0001903 | 0.0022041 | −0.0769231 | 0.0213049 |
| never received | 107922 | −0.0001495 | 0.0114964 | −0.25 | 0.25 |
| never delivered | 107922 | −0.0000926 | 0.0016085 | −0.0625 | 0.0666667 |
| always excellent | 107922 | −0.0000394 | 0.0008319 | −0.024 | 4.77e−09 |
| never responded | 107922 | −0.0000469 | 0.0041165 | −0.1666667 | 0.1666667 |

TABLE 4-continued

Exemplary summary statistics of dimension-modifier pairs

| Dimension-Modifier Pair | Observations | Mean | Standard Deviation | Min | Max |
|---|---|---|---|---|---|
| great buying | 107922 | −0.0001057 | 0.0028721 | −0.0769231 | 0.0769231 |
| super transaction | 107922 | −0.0000656 | 0.0014872 | −0.0714286 | 0.0714286 |
| great person | 107922 | −0.0000858 | 0.0015508 | −0.0833333 | 0.058823 |
| never heard | 107922 | −0.000176 | 0.0016118 | −0.03 | 0.04 |
| not received | 107922 | 0.0000864 | 0.0034954 | −0.0555556 | 0.0526316 |
| excellent communications | 107922 | −0.000075 | 0.001125 | −0.0233918 | 0.023391 |
| terrific condition | 107922 | −9.79e−07 | 0.0000511 | −0.005 | 0.0012508 |
| not have | 107922 | −0.0022077 | 0.0224192 | −0.6666667 | 0.5 |

TABLE 5

Exemplary summary statistics of dimension-modifier pairs (cont'd)

| Dimension-Modifier Pair | Observations | Mean | Standard Deviation | Min | Max |
|---|---|---|---|---|---|
| cancelled order | 107922 | −0.0005719 | 0.0100573 | −0.3333333 | 0.0200049 |
| definitely recommend | 107922 | −0.0003166 | 0.0042976 | −0.1666667 | 0.0338983 |
| not notified | 107922 | −0.0000279 | 0.0007656 | −0.02 | 0.0026596 |
| excellent seller | 107922 | 0.0081056 | 0.0380053 | −1 | 1 |
| not delivered | 107922 | 5.15e−06 | 0.0030023 | −0.1666667 | 0.1666667 |
| not shipped | 107922 | −0.0005664 | 0.0031205 | −0.0625 | 0.0625 |
| poor condition | 107922 | −0.0000625 | 0.0019898 | −0.0344828 | 0.0344828 |
| fast seller | 107922 | 0.0003116 | 0.0046761 | −0.0666667 | 0.0666667 |
| not ordered | 107922 | −0.0000805 | 0.0033164 | −0.1428571 | 0.1428571 |
| perfectly packaged | 107922 | 0.0004791 | 0.0040951 | −0.0350877 | 0.0264901 |
| bad experience | 107922 | −0.0002027 | 0.0019415 | −0.04 | 0.02 |
| A+++ seller | 107922 | −0.0001791 | 0.0028428 | −0.047619 | 0.04 |
| wrong CD | 107922 | 0.0000111 | 0.0005755 | −0.0205392 | 0.02 |
| wrong address | 107922 | −0.00027 | 0.0034527 | −0.0769231 | 0.0769231 |
| wrong book | 107922 | −0.0000628 | 0.0031658 | −0.3333333 | 0.0555556 |
| wrong game | 107922 | −0.0000296 | 0.0014374 | −0.0666667 | 0.0666667 |
| awesome transaction | 107922 | −0.0000558 | 0.0016608 | −0.0625 | 0.0200046 |

TABLE 6

Exemplary summary statistics of dimension-modifier pairs (cont'd)

| Dimension-Modifier Pair | Observations | Mean | Standard Deviation | Min | Max |
|---|---|---|---|---|---|
| best seller | 107922 | −0.0001497 | 0.0022142 | −0.0260756 | 0.0246914 |
| wrong item | 107922 | 0.0094492 | 0.0131771 | −0.1 | 0.1 |
| awesome service | 107922 | 0.0023027 | 0.0030124 | −0.0454545 | 0.037037 |
| very slow | 107922 | −0.0002231 | 0.002425 | −0.0201702 | 0.0100266 |
| quickly advertised | 107922 | −0.0002472 | 0.0028828 | −0.0454545 | 0.0909091 |
| several weeks | 107922 | −0.0001075 | 0.0030191 | −0.047619 | 0.047619 |
| late shipped | 107922 | −0.0005365 | 0.0025033 | −0.0236686 | 0.02 |
| defective product | 107922 | −0.0000367 | 0.0009372 | −0.125 | 0.0129032 |
| bad shape | 107922 | −1.13e−06 | 0.0015334 | −0.0454545 | 0.0454545 |
| not advertised | 107922 | −0.0001909 | 0.0036066 | −0.0769231 | 0.0769231 |
| happy service | 107922 | −0.000217 | 0.0020874 | −0.0242424 | 0.0242424 |
| very impressed | 107922 | −0.0003181 | 0.0034756 | −0.1666667 | 0.1111111 |
| later received | 107922 | −0.0004482 | 0.0069506 | −0.2 | 0.0363636 |

TABLE 7

Exemplary summary statistics of dimension-modifier pairs (cont'd)

| Dimension-Modifier Pair | Observations | Mean | Standard Deviation | Min | Max |
|---|---|---|---|---|---|
| not arrived | 107922 | −0.0001429 | 0.0050211 | −0.1666667 | 0.0833333 |
| top quality | 107922 | −0.0003333 | 0.0032658 | −0.047619 | 0.0338983 |

TABLE 7-continued

Exemplary summary statistics of dimension-modifier pairs (cont'd)

| Dimension-Modifier Pair | Observations | Mean | Standard Deviation | Min | Max |
|---|---|---|---|---|---|
| friendly service | 107922 | −0.002613 | 0.0218787 | −1 | 1 |
| slow shipping | 107922 | −0.0002223 | 0.0039393 | −0.0526316 | 0.0526316 |
| superb service | 107922 | −0.0000246 | 0.0017151 | −0.0625 | 0.0236686 |
| fair condition | 107922 | −0.0000553 | 0.0029515 | −0.3333333 | 0.0246914 |
| perfect item | 107922 | 0.0053321 | 0.0064172 | −0.0714286 | 0.0714286 |
| totally satisfied | 107922 | −0.0000489 | 0.0017618 | −0.037037 | 0.037037 |
| excellent service | 107922 | −0.00004 | 0.0008413 | −0.02 | 0.0000195 |
| great merchant | 107922 | −0.0001023 | 0.0026192 | −0.0273973 | 0.0273973 |
| very fast | 107922 | −0.0002404 | 0.0021852 | −0.0285714 | 0.0200043 |
| excellent condition | 107922 | −0.0000458 | 0.0027119 | −0.1666667 | 0.1666667 |
| ahead arrived | 107922 | −0.0007818 | 0.0052645 | −0.1428571 | 0.1428571 |

TABLE 8

Exemplary summary statistics of dimension-modifier pairs (cont'd)

| Dimension-Modifier Pair | Observations | Mean | Standard Deviation | Min | Max |
|---|---|---|---|---|---|
| received product | 107922 | −0.0000403 | 0.0007823 | −0.02 | 0.005 |
| great company | 107922 | −0.0003496 | 0.0036476 | −0.0555556 | 0.0555556 |
| promptly described | 107922 | −0.0003732 | 0.0033739 | −0.0333333 | 0.0909091 |
| easy service | 107922 | −0.0000147 | 0.0022246 | −0.02 | 0.02 |
| quick service | 107922 | −0.0028728 | 0.0148672 | −0.5 | 0.5 |
| great packaging | 107922 | −0.0009077 | 0.007408 | −0.2 | 0.1428571 |
| exactly arrived | 107922 | −0.0008714 | 0.0070406 | −0.3333333 | 0.3333333 |

Certain questions that may arise from the extraction of the dimension-modifier pairs using the exemplary method described above. For example, such questions may be (a) whether all the reputation characteristics expressed in the textual feedback have been captured (recall); and (b) whether the dimensions captured are accurate (precision). For the recall question, certain knowledge from computational linguistics and opinion mining can suggest that the buyers can use adjectives and adverbs to express their opinions. For example, in the experiments conducted with the collected data set, about 93% of the feedback postings contain such dimension-modifier pairs. For the precision question, the exemplary method can rely on the connection of text mining with econometrics to identify reputation dimensions that may be important. If a particular dimension-modifier pair is noise, then it will be difficult to have a statistically significant correlation with the price premiums.

After identifying all the dimension-modifier pairs, a score can be assigned to each pair in order to run the regressions for the price premium variables. An exemplary method can be provided for inferring the numerical scores that should be associated with each modifier, for each dimension. As discussed above, the textual portion of the feedback profile of seller i can be encoded as a n×p matrix M(i), with elements that belong to the global set of modifiers M. A score $a(\mu,j,k)$ that a modifier $\mu \in M$ assigns to dimension k, when it appears in the j-th posting is then assigned to each modifier $\mu$.

Since the buyers tend to read only the first few pages of textual-based feedback, rather than all the pages, recent text postings can influence the buyer's assessment more heavily. This can be modeled by assuming that K is the number of postings that appear on each page (K=25 for the collected data set), and that c is the probability of clicking on the "Next" link and moving to the next page of evaluations.

$$r_j = \frac{c^{\lfloor \frac{j}{K} \rfloor}}{\sum_{q=1}^{p} c^{\lfloor \frac{q}{K} \rfloor}} \quad (6)$$

Figure 6:
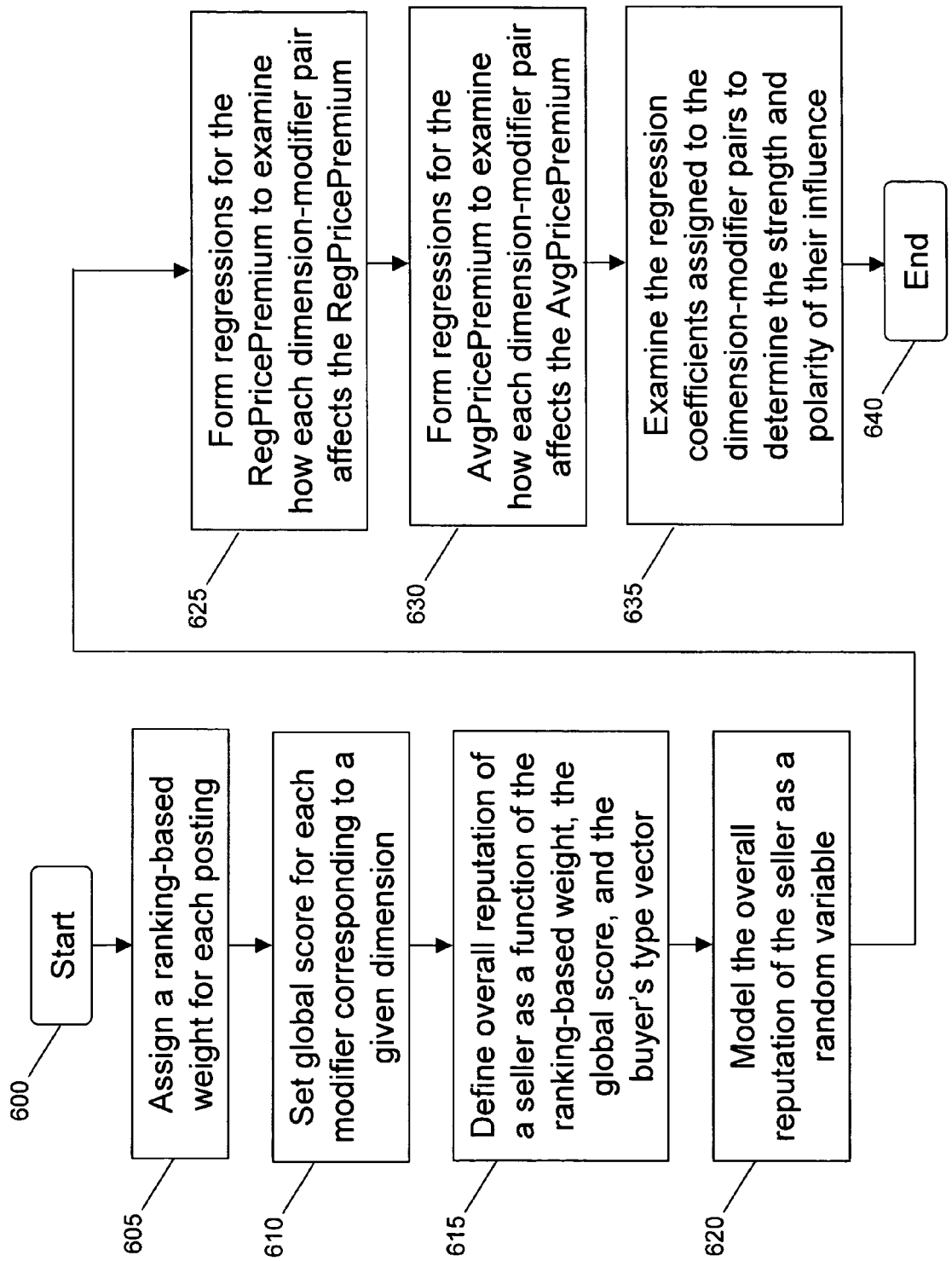
FIG. 6 is a flow chart of exemplary procedures identifying the steps for performing an econometric analysis of a data set based on both the numerical feedback and the textual feedback associated with sellers in an electronic market according to an exemplary embodiment of the present invention.

Accordingly, as shown in a flow diagram FIG. 6 which provides exemplary steps of yet another exemplary embodiment of the method of the present invention an econometric analysis of a data set can be performed based on the numerical and textual feedback associated with sellers in an electronic market are as follows. In step 605, a posting-specific weight $r_j$ can be assigned to the j-th posting as: where j is the rank of the posting, K is the number of postings per page, and p is the total number of postings for the given seller i. Then, in step 610, a global score $a(\mu,j,k)$ that the modifier $\mu$ assigns to dimension k in the j-th posting may be determined as follows:

$$a(\mu,j,k) = r_j \cdot a(\mu,k) \quad (7)$$

Further, following the analytical model described herein above, the buyers can vary based on the weight that they place on each dimension of interest. The buyer type vectors w can then be interpreted as being weights that they use to determine a weighted average of these modifier scores. The overall "reputation score" given by the buyer of type w to seller i whose feedback has converted to the matrix of modifiers $M(i) = \{\mu^i_{jk}\}$ can therefore be determined at step 615 as:

$$\Pi(i) = r^T \cdot A(M(i)) \cdot w \quad (8)$$

where $r = [r_1, r_2, \ldots, r_p]$ is the vector of the posting-specific weights. In addition, $$\Pi(i) = [r_1, r_2, \ldots, r_p] \begin{bmatrix} a(\mu^i_{11}, 1) & \cdots & a(\mu^i_{1n}, n) \\ \vdots & \ddots & \vdots \\ a(\mu^i_{p1}, 1) & \cdots & a(\mu^i_{pn}, n) \end{bmatrix} \begin{bmatrix} w_1 \\ \vdots \\ w_n \end{bmatrix} \quad (9)$$

if the buyer's type distribution F(w) is modeled as being independently distributed along each dimension, and each modifier score $a(\mu,k)$ is modeled as an independent random variable, then the random variable $\Pi(i)$ may be a sum of random variables.

For example, in step 620:

$$\Pi(i) = (w_1 \cdot a(\mu_1,k))R(\mu_1,1) + (w_2 \cdot a(\mu_2,k))R(\mu_2,1) + \ldots + (w_1 \cdot a(\mu_M,k))R(\mu_M,1) + \ldots + (w_n \cdot a(\mu_M,n))R(\mu_M,n) \quad (10)$$

where $R(\mu_j,k)$ is equal to the sum of the $r_i$ weights in all the postings in which the modifier $\mu_j$ modifies dimension k. $R(\mu_j, k)$ variable can be easily determined from the collected data set.

Interestingly, the distributions of $w_k.a(\mu_j,k)$ do not have to be estimated; instead, $w_k.a(\mu_j,k)$ can be treated as part of a regressor coefficient $\beta_i$ that a regression assigns to each regressor. In such case, the regressors can be the dimension-modifier pairs.

Therefore, each dimension-modifier pair can be considered as a separate regressor. Regressions similar to the ones described above in Equations (4) and (5) can then be executed in steps 625 and 630 after adding the $\Pi(.)$ variables for the seller and the competitors in the regressions. This exemplary process may provide a weight associated with each dimension-modifier pair, which can be interpreted as an ordinal measure of the "value" (or increase/decrease in pricing power) of having that pair associated with a particular transaction.

Accordingly, the dimension-modifier pairs that were statistically significant across all regressions may be identified in step 635. Tables 9-16 summarize the results of such determination. A weight of zero may imply that the dimension-modifier pair has no effect on the seller's pricing power, a weight above zero implies that it has a positive impact, and a weight lower than zero implies that it has a negative impact on the seller's (positive) price premium. A notice that these reflect changes in the seller's average pricing power across products after taking their average numerical scores and level of experience into account, and may highlight the importance of the value contained in the textual-based feedback.

TABLE 9

Exemplary effects of average reputation (numeric and textual feedback) and level of experience on pricing power with Regular Price Premium as the dependent variable. Standard errors are in parenthesis.

| Variable | Estimates (Seller and product level fixed effects) |
|---|---|
| ln(ProductPrice) | −0.84 (0.18) |
| DiffRating | −0.11 (0.012) |
| ln(DiffLife) | 0.038 (0.0007) |
| DiffCondition | 0.021 (0.006) |
| ln(NumberOfCompetitors) | −1.87 (0.011) |

TABLE 10

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Seller and product level fixed effects) |
|---|---|
| very recommended | 12.47 (2.38) |
| always excellent | 141.98 (34.52) |
| excellent communication | 18.38 (7.61) |
| terrific condition | 857.55 (108.15) |
| excellent condition | 8.53 (1.93) |
| excellent seller | 0.7 (0.37) |
| fast seller | 9.76 (2.12) |
| best seller | 48.8 (4.45) |
| perfectly packaged | 37.4 (4.26) |
| A+++ seller | 49.15 (3.87) |
| happy service | 21.56 (5.11) |
| friendly service | 8.21 (0.64) |
| easy service | 46.17 (5.87) |

TABLE 10-continued

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Seller and product level fixed effects) |
|---|---|
| awesome service | 26.05 (4.24) |
| very impressive | 21.3 (2.91) |
| top quality | 16.77 (2.41) |

TABLE 11

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Seller and product level fixed effects) |
|---|---|
| perfect item | 6.92 (1.74) |
| excellent purchase | 89.72 (15.47) |
| great merchant | 49.33 (4.68) |
| great company | 21.77 (2.69) |
| promptly described | 4.7 (1.09) |
| not have | −3.48 (0.17) |
| not notified | −103.69 (23.75) |
| not ordered | −13.4 (2.09) |
| not received | −9.44 (3.82) |
| not delivered | −12.25 (3.02) |
| wrong address | −17.54 (3.13) |
| wrong item | −2.5 (0.89) |
| never sent | −16.61 (4.8) |
| never responded | −4.87 (2.15) |
| still waiting | −6.38 (1.14) |
| cancelled order | −5.01 (2.4) |

TABLE 12

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Seller and product level fixed effects) |
|---|---|
| bad experience | −13.73 (4.86) |
| not advertised | −9.93 (1.41) |
| wrong CD | −32.58 (12.36) |
| wrong book | −17.39 (1.87) |
| wrong game | −41.54 (5.31) |
| defective product | −13.19 (4.4) |
| $R^2$ (%) | 62.7 |

TABLE 13

Exemplary effects of average reputation (numeric and textual feedback) and level of experience on pricing power with Regular Price Premium as the dependent variable. Standard errors are in parenthesis.

| Variable | Estimates (Product, seller and competitor fixed effects) |
|---|---|
| ln(ProductPrice) | 0.13 (0.09) |
| DiffRating | 0.027 (0.015) |

TABLE 13-continued

Exemplary effects of average reputation (numeric and textual feedback) and level of experience on pricing power with Regular Price Premium as the dependent variable. Standard errors are in parenthesis.

| Variable | Estimates (Product, seller and competitor fixed effects) |
| --- | --- |
| ln(DiffLife) | 0.01 (0.005) |
| DiffCondition | 0.021 (0.006) |
| ln(NumberOfCompetitors) | −1.38 (0.027) |

TABLE 14

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Product, seller and competitor fixed effects) |
| --- | --- |
| very recommended | 4.17 (1.26) |
| excellent seller | 1.6 (0.43) |
| A+++ seller | 23.12 (3.64) |
| superb service | 23.67 (6.01) |
| perfect item | 3.83 (1.77) |

TABLE 15

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Product, seller and competitor fixed effects) |
| --- | --- |
| great merchant | 8.31 (3.3) |
| excellent purchase | 32.83 (9.17) |
| very fast | 15.33 (4.65) |
| great company | 5.55 (2.28) |
| easy service | 4.26 (1.25) |
| happy service | 13.28 (4.3) |
| great packaging | 2.51 (0.69) |
| excellent value | 6.79 (1.75) |
| excellent response | 4.33 (1.75) |
| slow shipping | −5.9 (1.35) |
| very slow | −13.58 (1.94) |
| never delivered | −20.37 (4.17) |
| never heard | −65.16 (7.70) |
| several weeks | −14.46 (3.27) |
| yet have | −6.07 (2.19) |

TABLE 16

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Product, seller and competitor fixed effects) |
| --- | --- |
| not received | −9.36 (1.69) |
| not arrived | −10.56 (3.76) |
| not shipped | −5.15 (2.29) |
| bad experience | −16.43 (3.3) |

TABLE 16-continued

Exemplary effects of average reputation (numeric and textual feedback) and level of experience on pricing power with Regular Price Premium as the dependent variable. Standard errors are in parenthesis. (cont'd)

| Dimension-Modifier Pair | Estimates (Product, seller and competitor fixed effects) |
| --- | --- |
| poor condition | −35.54 (7.16) |
| not advertised | −18.40 (3.82) |
| wrong address | −5.49 (1.02) |
| wrong item | −1.31 (0.61) |
| wrong CD | −22.75 (9.08) |
| $R^2$ (%) | 19.66 |

Generally, there may be a small number of "real-life" dimensions of reputation, which actually matter to the buyers. These exemplary dimensions, shown in FIG. 7, can be as follows:

(a) Delivery and Contract Fulfillment (705): the reputation for consistent, fast, and seamless delivery of a product considerably increases the overall pricing power of a seller. The extent of order fulfillment and the speed at which it is executed, can be important in such transactions. In contrast, problems with shipping, such as items being sent to the wrong address or even instances of outright fraud such as products that never arrived or were received, can be a major source of frustration for the buyers. In fact, this can be construed by the buyers as being equivalent to reneging, either intentionally (when the seller knowingly disregards promises) or unwillingly (when circumstances beyond the seller's control cause delays in delivery). As indicated in the results, reneging significantly hurts the likelihood of a seller to achieve a price premium over its competitors in future transactions.

(b) Responsiveness/Communications (710): Another important dimension of reputation is the responsiveness of a seller to the questions and concerns of a buyer. The sellers who respond quickly and sensitively to the needs of their customers, e.g., prompt in communication, can enjoy higher price premiums. In contrast, postings that indicate unresponsiveness and lack of notification on the seller's part can considerably reduce the price premiums.

(c) Customer Service (715): An important dimension on which sellers can generate price premiums is the type of service they render to their customers. In an electronic marketplace where buyers and sellers are separated by time and space this can become an important factor during a transaction. Thus, price premiums are consistently affected by dimension-modifier pairs such as "superb service," "quick service" or "happy service."

(d) Product Quality and Appropriate Representation (720): The buyers generally pay attention to the quality of the received merchandise. Given that the act of describing a product appropriately by the seller on the electronic market can constitute an implicit guarantee for the buyer, any deviation from the promised description is tantamount to a product misrepresentation, and may constitute a serious violation of trust. The results described herein indicates that the customers generally expect a full, working version of the product they buy, and provide positive feedback postings, which can improve the ability of the seller to charge higher prices in the future. When this is not the case (e.g., when the buyers receive a "wrong CD" or "wrong game" or even the "wrong book" that comes with many packaged software), the respective negative postings generally decrease the pricing premiums.

This shows the importance of a one-to-one mapping between description and actual product delivery. Accuracy and reliability are very important if the seller plans to sell products and/or services at a premium.

(e) Packaging (725): Since the transactions generally involve shipping, the buyers pay attention to the packaging of the product. In the collected data set, a statistical significant effect was observed only on positive comments regarding the packaging (e.g., for comments like "great packaging," or "perfectly packaged"). However, no statistically meaningful decrease on price premiums was observed when the comments on packaging were negative. Nonetheless, the frequency of negative comments on packaging were comparatively rare.

(f) Seller-Specific Comments (730): Certain buyers who had a positive experience often leave laudatory comments or compliments about the seller. This includes comments for the established professional merchants such as "great merchant," or "great company," and for smaller individual sellers who are commented on with phrases such as "excellent seller," "best seller" or "fast seller." This feedback can also have a significant impact on price premiums that the sellers can command in the electronic marketplace.

(g) Overall feeling (735): A large portion of the feedback postings commented on the overall quality of the transaction and on the overall feeling of working with the seller: the positive comments (e.g., "awesome transaction" or "totally satisfied"), as expected, improve the pricing power of the sellers. The exemplary results described herein also show that aggregate comments such as "very recommended," "A+++ seller" or "very impressive" affect price premiums significantly. When the comments are negative, however, there may be fewer statistically significant dimensions. A possible reason for this can be attributed to the nature of the negative comments, e.g., when the buyers are dissatisfied they tend to give long explanations giving the specific dimension across which the sellers did not perform appropriately. When the customers are happy, they tend to leave short postings commenting on the overall feeling.

Figure 7:
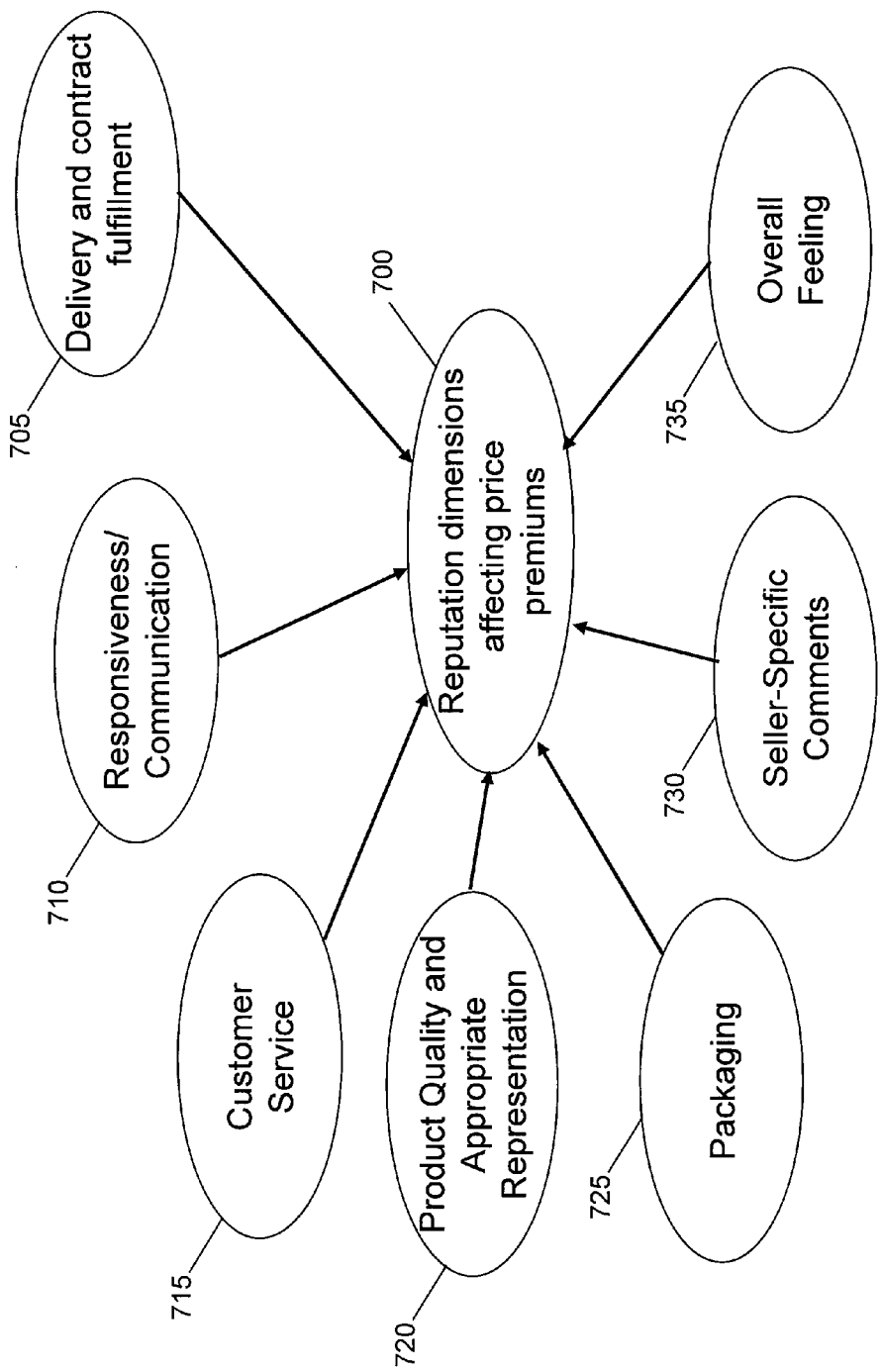
FIG. 7 is a schematic diagram of dimensions of a reputation which can influence price premiums of the sellers in the electronic market according to an exemplary embodiment of the present invention.

The dimensions identified in the exemplary graph of FIG. 7 were derived by using completely automatic techniques for assessing the content of textual and numeric feedback, without the need for expensive, manual inspection of the comments left by the buyers. As such, the method described herein can be deployed over existing reputation mechanisms, thereby significantly improving their impact. Since most reputation mechanisms rely on voluntary reporting of transaction outcomes, the buyers do not leave feedback on every transaction. An understanding of the different dimensions of the reputation may provide better incentives for more of the buyers to leave feedback.

The sellers can parse and understand their customers' sentiments and preferences, and comprehend how they can strengthen their competitive advantages in the marketplace. The buyers can use this information to identify sellers who meet some minimum level of quality in the fulfillment characteristics of a transaction. For example, a buyer who wants to purchase expensive electronic equipment may decide to filter out the sellers who have a reputation of using cheap packaging materials, and focus on the sellers who have a reputation of selling in low prices even though they can be, sometimes, slower with delivery.

Figure 8:
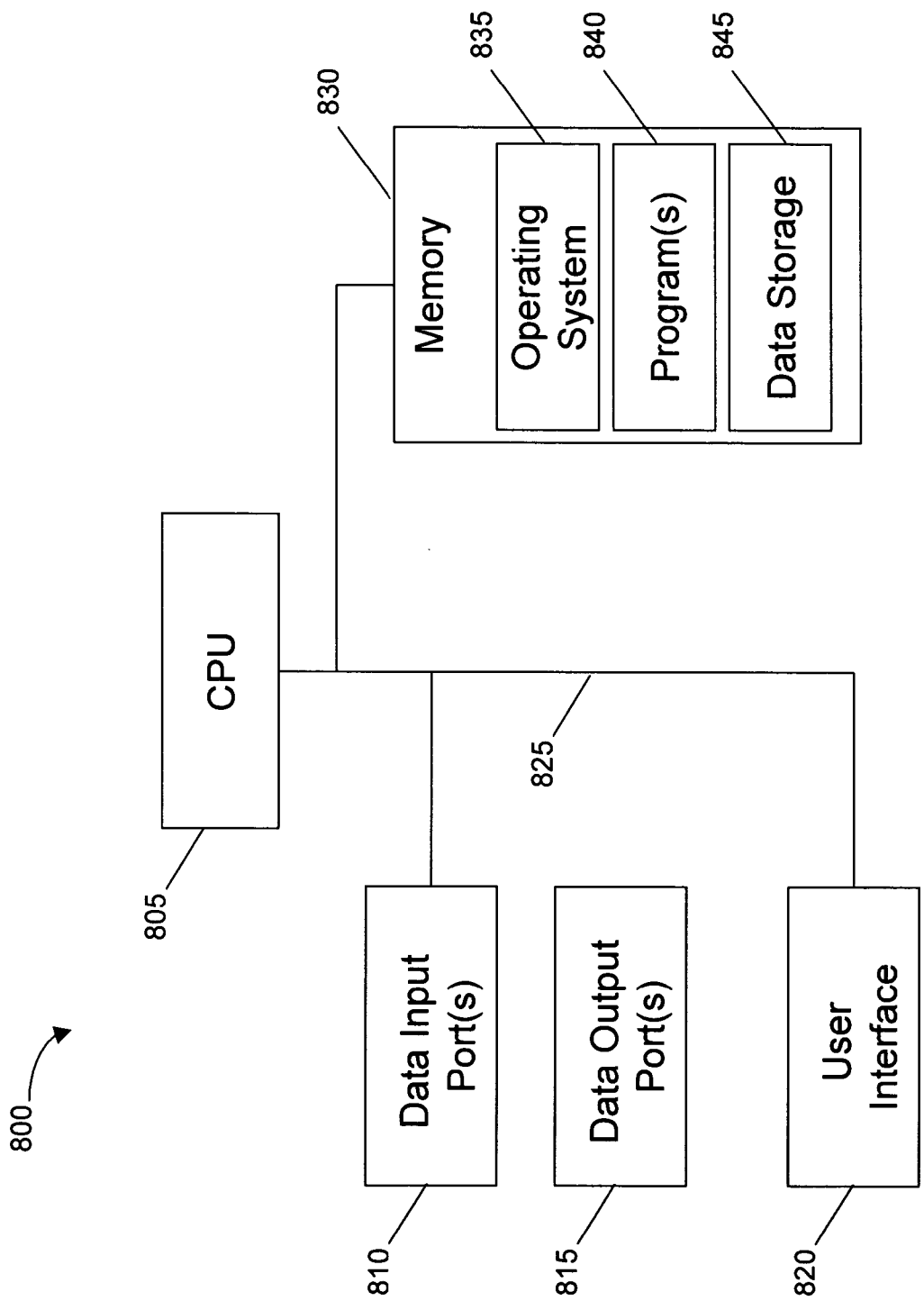
FIG. 8 is a simplified block diagram of a system for modeling the electronic market based on the online reputation the sellers according to certain exemplary embodiments of the present invention.

An exemplary block diagram of a system for modeling an electronic market based on the online reputation of sellers according to one exemplary embodiment of the present invention is shown in FIG. 8. Such system for modeling the electronic marketplace based on the online reputation of the sellers can include a computing device 800, which may be any computing device having a central processing unit ("CPU") such as CPU 805, a memory or storage arrangement 830, at least one data input port 810, at least one data output port 815, and a user interface 820 all interconnected by one or more buses 825. The memory/storage arrangement 830 can store the operating system software 835 and other software programs including a program 840 for modeling the electronic marketplace based on the online reputation of the sellers. The memory/storage arrangement 830 further includes data a storage arrangement 845 for storing collected data sets through one of the input port 810 and/or for storing results generated during current execution of the program 840, as discussed above.

The program 840 may be organized into modules which can include coded instructions that when executed by the CPU 805, can cause the computing device 800 to carry out different aspects, modules, or steps of the method for modeling an electronic marketplace based on the online reputation (numeric and textual) and sellers according to an exemplary embodiment of the present invention. All or part of memory unit 830, such as data storage unit 845, may reside in a different geographical location from that of CPU 805 and be coupled to CPU 805 through one or more computer networks.

The program 840 may also include a module including coded instructions, which, when executed by the CPU 805, can cause the computing device 800 to provide graphical user interfaces ("GUI") for the user to interact with the computing device 800, and direct the flow of the program 840.

The modules provided in the program 840 can characterize how both numerical and qualitative measures of reputation affect the seller's pricing power in the electronic market. Other modules that may be provided in the program 840 may modify the method using which the "weight" associated with the dimensions of textual feedback can be estimated, toward being able to associate or monetary value with each dimension-modifier pair. Another exemplary module may refine the model of the buyer preferences to account for a heterogeneity in the buyer population, enabling the identification of distinct segments of buyers, each of whom can value a different set of dimensions of the reputation which would further highlight the reputation value of textual feedback. Yet another module may identify and account for patterns of manipulation of online reputation based on the analysis of the associated text. Economic measures of how seller characteristics are evaluated from a consumer's perspective may also be generated in the module of the program 840. The modules may also be provided to observe how feedback from buyer-seller pairs evolves over time to provide information that can enable the buyers to better "benchmark" the feedback.

According to a certain exemplary embodiment of the present invention, method, system and computer-accessible medium can be provided for analyzing qualitative information associated with a characteristic of at least one entity based on associated quantitative information, as shown in FIG. 9A which illustrates a flow diagram providing procedures of such exemplary embodiment, starting with step 900. For example, in step 905, first information which contains at least in part a qualitative information relating to the entity can be obtained. In step 910, second information associated with at least one attribute of the characteristic obtained from the first information can be determined. In step 915, third information which contains at least in part quantitative information associated with the entity can be obtained. Further, in step 920, fourth information can be obtained as a function of the second information and the third information to determine which one or more attributes affects the characteristic.

Figure 9B:
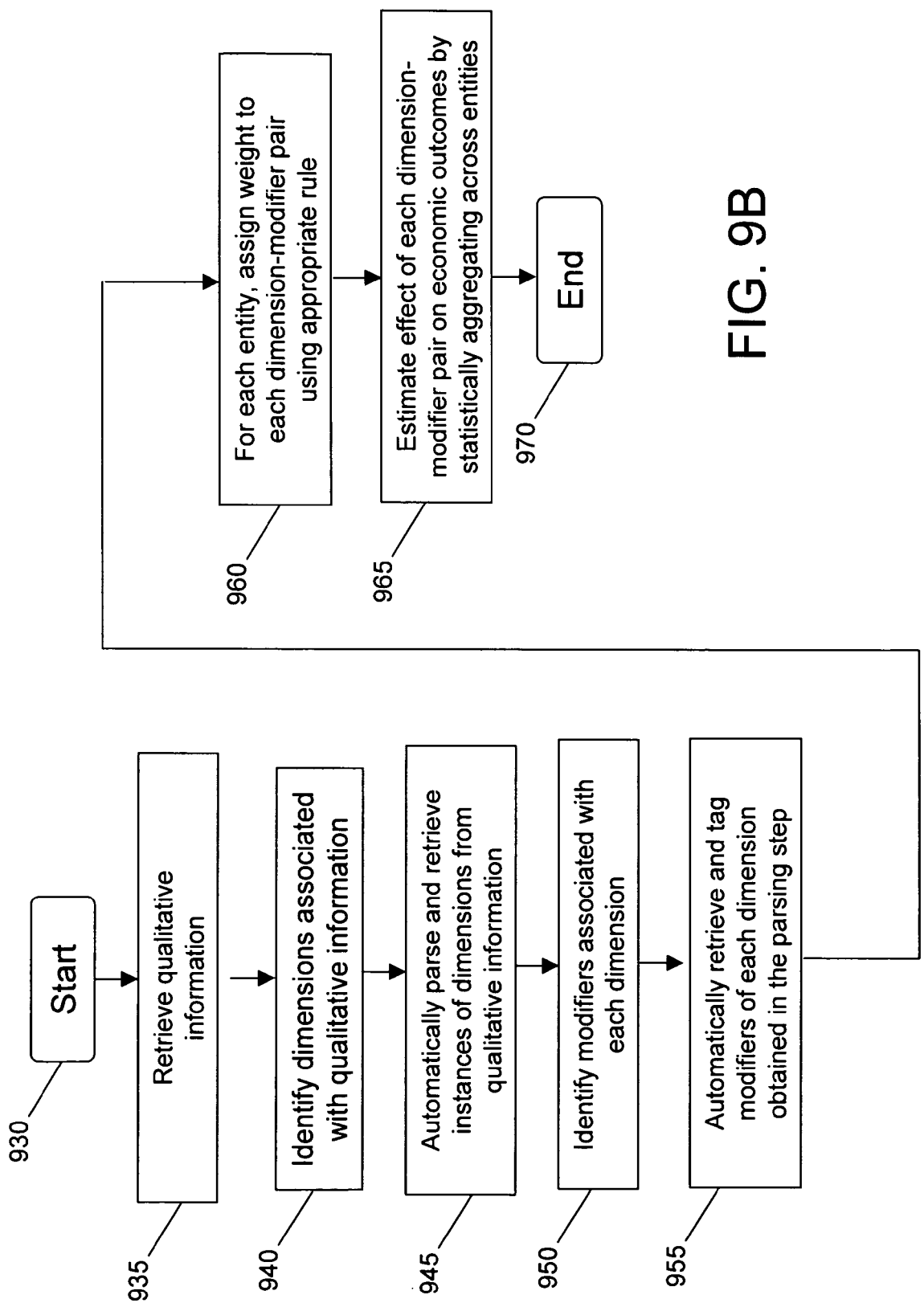
FIG. 9B is a flow chart of another exemplary embodiment of the method according to the present invention for analyzing the qualitative information associated with the characteristic of the entity based on the associated quantitative information.

FIG. 9B shows another exemplary embodiment of the method, system and computer-accessible medium for analyzing the qualitative information associated with the characteristic of at least one entity based on associated quantitative information, starting from step 930. For example, in step 935, the qualitative information can be obtained. In step 935, dimensions associated with qualitative information can be identified. Examples of the dimensions can include nouns, noun phrases, verbs and verb phrases in textual information, topic, subject or phrase in an audio recording, stage of shopping in a video recording of a customer in a store, etc. Then, in step 945, instances of the dimensions can be automatically parsed and retrieved from the qualitative information. Modifiers associated with each of the dimensions can be identified in step 950. Examples of these modifiers can include adjectives that modify nouns or noun phrases, adverbs that modify verbs and verb phrases in textual information, frequency or pitch of voice that modifies a topic, subject or phrase in an audio recording, categorized facial expression or intensity of movement that modifies the stage of shopping in a video recording of a customer in a store. etc.

Further, in step 955, the modifiers of each of the dimensions obtained in step 945 can be automatically retrieved and tagged. For each entity, in step 960, weight can be assigned to each dimension-modifier pair using an appropriate rule. One example of such rule can be to assign weights approximately equal to the fraction of instances in the qualitative information associated with the entity that the dimension-modifier pair appears. Further the effect of each dimension-modifier pair on economic outcomes can be estimated in step 965 by statistically aggregating across the entities. For example, this can be done by estimating an ordinary least-squares regression with an economic variable such as price, price premium, revenue or profit as the dependent variable, each dimension-modifier pair as a binary independent variable, and the weights as the coefficients of the independent variables.

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Steps of the described processes may be reordered or combined, and other steps may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents. The publications referenced above are incorporated herein by reference in their entireties.

What is claimed is:

1. A method for analyzing qualitative information associated with a characteristic of at least one entity based on associated quantitative information, comprising:

obtaining first information which contains at least in part a qualitative information relating to at least one of the at least one entity;

determining second information associated with at least one attribute of the characteristic obtained from the first information;

obtaining third information which contains at least in part quantitative information associated with at least one of at least one entity; and using a computing device, establishing fourth information as a function of the second information and the third information to determine at least one quantitative effect of the at least one attribute on the characteristic, wherein the at least one entity includes a plurality of entities, wherein at least one of the first information, the second information, or the third information relates to the entities, wherein the fourth information is established by a performance of a statistical aggregation procedure across the plurality of entities, wherein the second information comprises a plurality of dimension-modifier pairs each having a dimension and a modifier, wherein a numerical weight is associated with each particular dimension-modifier pair for a particular modifier relative to a particular dimension, and wherein the fourth information is further established using the weights.

2. The method of claim 1, wherein the quantitative information relates to at least one of a price, a revenue, a profit, a demand or an economic variable.

3. The method of claim 1, wherein the at least one entity comprises at least one of a seller, a buyer, a merchant, a firm, a product, a service, or a location.

4. The method of claim 1, wherein the characteristic comprises at least one of a reputation, a quality, or a reliability.

5. The method of claim 1, wherein the procedure of obtaining the first information comprises collecting a textual feedback associated to the at least one entity.

6. The method of claim 5, wherein the procedure of determining the second information comprises parsing the textual feedback to identify the at least one attribute of the characteristic.

7. The method of claim 6, wherein the procedure of parsing the textual feedback comprises retrieving nouns, noun phrases, verbs, and verbal phrases as dimensions of reputation of the least one entity.

8. The method of claim 7, wherein the procedure of determining the second information comprises determining at least one dimension-modifier pair associated with the at least one attribute.

9. The method of claim 8, wherein the procedure of determining the at least one dimension-modifier pair comprises retrieving adjectives and adjectival phrases modifying the nouns and the noun phrases as modifiers to the dimensions of the reputation.

10. The method of claim 9, further comprising retrieving adverbs and adverbial phrases modifying the verbs and the verbal phrases as modifiers to the dimensions of the reputation.

11. The method of claim 10, wherein the procedure of obtaining the third information comprises collecting a numerical feedback associated to the at least one entity, and identifying numerical variables adapted to form the numerical feedback.

12. The method of claim 11, wherein the numerical variables comprise one or more of: a product price, a sale price, a rating, a product condition, or a number of competitors.

13. The method of claim 11, wherein the procedure of establishing the fourth information comprises establishing statistical regressions using the fourth information as a dependent variable, and the numerical variables and the at least one dimension-modifier pair as independent variables.

14. The method of claim 13, wherein the fourth information is associated to the at least one entity and measured relative to further entities.

15. The method of claim 14, further comprising analyzing results from a regression procedure associated with the third information to identify the at least one dimension-modifier pair that is statistically significant in affecting the fourth information.

16. The method of claim 1, wherein the qualitative information comprises data associated with the sentiment information.

17. The method of claim 1, wherein the qualitative information comprises data associated with the opinion information.

18. The method of claim 1, wherein the qualitative information comprises data associated with the perspective information.

19. The method of claim 1, wherein the qualitative information comprises data associated with the user experience information.

20. The method of claim 1, further comprising at least one of displaying or storing the fourth information in a storage arrangement in at least one of a user-accessible format or a user-readable format.

21. The method of claim 1, wherein at least one of the weights associated with each particular dimension-modifier pair is based on a relative position of a particular portion of the first information in relation to another portion of the first information.

22. The method of claim 21, wherein the first information relates to a plurality of postings including textual feedback associated with a plurality of transactions between at least one buyer and at least one seller, wherein each particular posting relates to a particular one of the transactions, and wherein at least one of the weights associated with each particular dimension-modifier pair is based on a rank associated with each particular posting.

23. The method of claim 22, further comprising determining a further numerical weight associated with each particular dimension-modifier pair using each particular dimension-modifier pair as a separate regressor, wherein each corresponding further numerical weight includes a measure of an increase or a decrease of a value of an economic variable for a particular seller relative to other sellers having the same dimension-modifier pair associated with the particular transaction, and wherein the fourth information is further established based on the further weights.

24. The method of claim 23, wherein the economic variable includes a representation of pricing power.

25. A system for analyzing qualitative information associated with a characteristic of one or more entities based on associated quantitative information, comprising:
   a storage arrangement having modules provided thereon which are capable of configuring a processing arrangement to:
      obtain first information which contains at least in part qualitative information relating to at least one entity;
      determine second information associated with at least one attribute of the characteristic obtained from the first information;
      obtain third information which contains at least in part quantitative information associated with at least one of the at least one entity; and
      establish fourth information as a function of the second information and the third information to determine at least one quantitative effect of the at least one attribute on the characteristic, wherein the at least one entity includes a plurality of entities, wherein at least one of the first information, the second information, or the third information relates to the entities, wherein the fourth information is established by a performance of a statistical aggregation procedure across the plurality of entities, wherein the second information comprises a plurality of dimension-modifier pairs each having a dimension and a modifier, wherein a numerical weight is associated with each particular dimension-modifier pair for a particular modifier relative to a particular dimension, and wherein the fourth information is further established using the weights.

26. The system of claim 25, wherein the program modules configured to determine second information comprise a part-of-speech tagger module.

27. The system of claim 26, wherein the program modules configured to determine second information further comprise a syntactic parser module.

28. The system of claim 25, wherein the program modules configured to establish fourth information comprise statistical regression modules.

29. The system of claim 25, wherein at least one of the weights associated with each particular dimension-modifier pair is based on a relative position of a particular portion of the first information in relation to another portion of the first information.

30. The system of claim 29, wherein the first information relates to a plurality of postings including textual feedback associated with a plurality of transactions between at least one buyer and at least one seller, wherein each particular posting relates to a particular one of the transactions, and wherein at least one of the weights associated with each particular dimension-modifier pair is based on a rank associated with each particular posting.

31. The system of claim 30, wherein the modules are further capable of configuring the processing arrangement to determine a further numerical weight associated with each particular dimension-modifier pair using each particular dimension-modifier pair as a separate regressor, wherein each corresponding further numerical weight includes a measure of an increase or a decrease of a value of an economic variable for a particular seller relative to other sellers having the same dimension-modifier pair associated with the particular transaction, and wherein the fourth information is further established based on the further weights.

32. The system of claim 31, wherein the economic variable includes a representation of pricing power.

33. A software arrangement provided for analyzing qualitative information associated with a characteristic of one or more entities based on associated quantitative information, comprising:
   a first module, which when executed by a processing arrangement causes the processing arrangement to obtain first information which contains at least in part qualitative information relating to at least one entity;
   a second module, which when executed by a processing arrangement causes the processing arrangement to determine second information associated with at least one attribute of the characteristic obtained from the first information;
   a third module, which when executed by a processing arrangement causes the processing arrangement to obtain third information which contains at least in part quantitative information associated with at least one of the least one entity; and
   a fourth module, which when executed by a processing arrangement causes the processing arrangement to establish fourth information as a function of the second information and the third information to determine at least one quantitative effect of the at least one attribute on the characteristic, wherein the at least one entity includes a plurality of entities, wherein at least one of the first information, the second information, or the third information relates to the entities, wherein the fourth information is established by a performance of a statistical aggregation procedure across the plurality of entities, wherein the second information comprises a plurality of dimension-modifier pairs each having a dimension and a modifier, wherein a numerical weight is associated with each particular dimension-modifier pair for a particular modifier relative to a particular dimension, and wherein the fourth information is further established using the weights.

34. The software arrangement of claim 33, wherein at least one of the weights associated with each particular dimension-modifier pair is based on a relative position of a particular portion of the first information in relation to another portion of the first information.

35. The software arrangement of claim 34, wherein the first information relates to a plurality of postings including textual feedback associated with a plurality of transactions between at least one buyer and at least one seller, wherein each particular posting relates to a particular one of the transactions, and wherein at least one of the weights associated with each particular dimension-modifier pair is based on a rank associated with each particular posting.

36. The software arrangement of claim 35, further comprising a further module, which when executed by the processing arrangement further causes the processing arrangement to determine a further numerical weight associated with each particular dimension-modifier pair using each particular dimension-modifier pair as a separate regressor, wherein each corresponding further numerical weight includes a measure of an increase or a decrease of a value of an economic variable for a particular seller relative to other sellers having the same dimension-modifier pair associated with the particular transaction, and wherein the fourth information is further established based on the further weights.

37. The software arrangement of claim 36, wherein the economic variable includes a representation of pricing power.

38. A computer-accessible medium which includes a set of instructions that are provided for analyzing qualitative information associated with a characteristic of one or more entities based on associated quantitative information, wherein, when a processing arrangement executes the instructions, the processing arrangement executes the procedures comprising of:
obtaining first information which contains at least in part qualitative information relating to at least one entity;
determining second information associated with at least one attribute of the characteristic obtained from the first information;
obtaining third information which contains at least in part quantitative information associated with at least one of the at least one entity; and
establishing fourth information as a function of the second information and the third information to determine at least one quantitative effect of the at least one attribute on the characteristic, wherein the at least one entity includes a plurality of entities, wherein at least one of the first information, the second information, or the third information relates to the entities, wherein the fourth information is established by a performance of a statistical aggregation procedure across the plurality of entities, wherein the second information comprises a plurality of dimension-modifier pairs each having a dimension and a modifier, wherein a numerical weight is associated with each particular dimension-modifier pair for a particular modifier relative to a particular dimension, and wherein the fourth information is further established using the weights.

39. The computer-accessible medium of claim 38, wherein at least one of the weights associated with each particular dimension-modifier pair is based on a relative position of a particular portion of the first information in relation to another portion of the first information.

40. The computer-accessible medium of claim 39, wherein the first information relates to a plurality of postings including textual feedback associated with a plurality of transactions between at least one buyer and at least one seller, wherein each particular posting relates to a particular one of the transactions, and wherein at least one of the weights associated with each particular dimension-modifier pair is based on a rank associated with each particular posting.

41. The computer-accessible medium of claim 40, wherein, when the processing arrangement executes the instructions, the processing arrangement further executes the procedures further comprising determining a further numerical weight associated with each particular dimension-modifier pair using each particular dimension-modifier pair as a separate regressor, wherein each corresponding further numerical weight includes a measure of an increase or a decrease of a value of an economic variable for a particular seller relative to other sellers having the same dimension-modifier pair associated with the particular transaction, and wherein the fourth information is further established based on the further weights.

42. The computer-accessible medium of claim 41, wherein the economic variable includes a representation of pricing power.

* * * * *